US012737553B1

(12) United States Patent
Jaeger et al.

(10) Patent No.: US 12,737,553 B1
(45) Date of Patent: Sep. 15, 2026

(54) ROUND TRIP SYSTEM FOR PARSING MEANING

(71) Applicants: Dennis Jaeger, Allen, TX (US); Swaroop Kallakuri, Coppell, TX (US)

(72) Inventors: Dennis Jaeger, Allen, TX (US); Swaroop Kallakuri, Coppell, TX (US)

(73) Assignee: Piren Technology Corporation, Plano, TX (US)

( * ) Notice: Subject to any disclaimer, the term of this patent is extended or adjusted under 35 U.S.C. 154(b) by 480 days.

(21) Appl. No.: 18/091,971

(22) Filed: Dec. 30, 2022

Related U.S. Application Data

(60) Provisional application No. 63/428,353, filed on Nov. 28, 2022.

(51) Int. Cl.

| | |
|---|---|
| ***G06F 40/40*** | (2020.01) |
| ***G06F 40/211*** | (2020.01) |
| ***G06F 40/279*** | (2020.01) |
| ***G06F 40/30*** | (2020.01) |

(52) U.S. Cl.
CPC ............ *G06F 40/40* (2020.01); *G06F 40/211* (2020.01); *G06F 40/279* (2020.01); *G06F 40/30* (2020.01)

(58) Field of Classification Search
CPC ...... G06F 40/40; G06F 40/211; G06F 40/279; G06F 40/30
See application file for complete search history.

(56) References Cited

U.S. PATENT DOCUMENTS

| | | | | |
|---|---|---|---|---|
| 10,242,668 | B2 * | 3/2019 | Mun | G10L 15/183 |
| 10,943,072 | B1 * | 3/2021 | Jaganmohan | G06N 5/041 |
| 10,963,525 | B2 * | 3/2021 | Nishant et al. | G06N 3/006 |
| 11,636,853 | B2 * | 4/2023 | Howard | G10L 15/22 |
| 2016/0092549 | A1 * | 3/2016 | Byron et al. | G06F 40/30 |

FOREIGN PATENT DOCUMENTS

| | | | |
|---|---|---|---|
| EP | 2750050 A2 * | 7/2014 | G06F 17/30864 |

* cited by examiner

*Primary Examiner* — Paras D Shah
*Assistant Examiner* — Nicholas D Lowen
(74) *Attorney, Agent, or Firm* — LOZA & LOZA, LLP; Thomas H. Ham

(57) ABSTRACT

A computer-implemented method, a system, and a non-transitory computer-readable storage medium are described. In an embodiment, a computer-implemented method involves operating a natural language understanding process utilizing at least one of a Machine Learning Model and a Deep Learning Model that generates at least one of the following: entities, attributes, relationships and meaning, connected through at least one of a domain and a context in time, producing an operable meaning. Said natural language understanding process involves utilizing said entities, attributes, relationships and meaning as searchable data, presenting an input to be understood by a computing system and presented as a grammatically correct syntax based on said at least one of said domain and said context in time, and extracting at least one of an entity, attribute, relationship and meaning in association with to said grammatically correct syntax to be stored as semantic data knowledge.

14 Claims, 10 Drawing Sheets

Audio Input / Text Input
502
Speech ?
532
Yes
No
ASR Decoder
104
Context Engine
116
Next Word Prediction Module
118
Grammar Correction Module
120
Inference Engine
122
History of Change
108
Domain Knowledge Module
126
Parsing Engine Module
128
Relationships Module
130
Operable Meaning
112

Time in Pico Seconds

| | Process | FLOPS | Start Time | End Time |
|---|---|---|---|---|
| 1 | ASR Decoder | 768000000 | 0.1 | 2.4 |
| 2 | Language Model | 781300 | 1 | 2.4 |
| 3 | Information Retrieval and Presentation | 51000 | 2 | 2.6 |

| Layer | FLOPs (Million) |
| --- | --- |
| Feature Extraction | 0.49 |
| Layer 1 ReLU | 0.03 |
| Layer 2 ReLU | 0.03 |
| Layer 3 ReLU | 0.03 |
| Layer 4 RNN | 5.94 |
| Layer 5 ReLU | 0.03 |
| Softmax Layer | 1.13 |
| Total | 7.68 |

| Operation | Total |
| --- | --- |
| Entropy based Transformer | 731000 |
| Classifier / Scorer | 50300 |
| | 781300 |

| Information Retrieval | 51000 |
| --- | --- |

ROUND TRIP SYSTEM FOR PARSING MEANING

CROSS-REFERENCE TO RELATED APPLICATIONS

This application claims priority from U.S. Provisional Patent Application Ser. No. 63/428,353, filed on Nov. 28, 2022, the contents of which are incorporated herein by reference.

BACKGROUND

Speech recognition technologies have advanced to the point that humans can communicate with computing devices using speech. These systems use approaches to detect the words uttered by a human user based on the various features of the audio input received. The combination of voice recognition and natural language processing methods enables speech-based user control of a computing device to execute tasks depending on a user's spoken requests. Voice processing refers to the combination of speech recognition and natural language understanding processing methods. Additionally, speech processing may turn a user's speech into text data, which can subsequently be delivered to text-based software applications.

Computers, handheld devices, telephone computer systems, kiosks, and a vast array of other devices may employ speech processing to enhance human-computer interactions.

In the past 25 years, a substantial amount of research has been conducted in the field of natural language comprehension. Natural language comprehension comprises, in the widest sense, the transformation of human-readable materials into machine-readable formats. Among the applications for natural language comprehension are the indexing and retrieval of free-text texts and the subject-based categorization of materials. Manual techniques are time-consuming, and highly skilled personnel are needed to evaluate material, but they are sometimes mistake prone due to human error and the inconsistent usage of words and codes. As a result, there is a great desire to build dependable computer systems capable of doing these jobs.

Understanding language meaning has been a constant challenge. A 'bat' may be a sporting equipment or an arboreal, flying animal. Despite having the same spelling, they have different meanings and contexts. Similarly, 'There' and 'Their' have the same pronunciation but distinct spellings and meanings.

Current natural language understanding systems for fine-grained meaning representation of text grasp the user's purpose relative to context and time. The time-consuming, relatively inaccurate retrieval of free-text poses the greatest difficulty. Existing systems employ standard word matching or idea matching. These systems rely only on words or concepts, rather than context-dependent meaning. For instance, U.S. Pat. No. 4,868,733 to Fujisawa et al utilizes "concepts" represented by words and "relationships" between the "concepts." However, the ideas are really words or phrases structured hierarchically such that some terms encompass others. The system of the invention disclosed herein describes a way to represent knowledge, in whole or in part, as graph data, which includes underlying methods to retrieve and utilize understanding as meaning based on context in time.

[CN103761242B] China Patent No. CN103761242B describes searching system which includes a structured database and search engine. A structured database has numerous records, each with a header field, content field, and at least one point of field with guidance and numeric fields. A guide field stores record guides, a numeric field stores numerical values, and a content field stores content detail data. Regarding user requests keywords, a search engine preforms full-text searches on a database record, and a retrieval result is delivered to a knowledge assistance understanding module. An understanding module determines user intention and returns desired information after user view is confirmed. The described search engine in this patent performs full-text searches on structured databases. The numeric data in each component is related and expresses the user's message to the record's intent. Though it is in the same field, this is completely different from the new invention disclosed herein in many aspects. A key difference is the database of this new invention is unstructured with entities, attributes and relationships which convey meaning, and search is performed based on the meaning of an input, not keywords. With this new invention, an input defining a meaning can include multiple data, which can be both digital and analog, and which can include relationships defined by visual data, gestural data, conceptual data and any other data that has a relevance to said input at any point in time.

[U.S. Pat. No. 9,824,083B2] US Patent No. U.S. Pat. No. 9,824,083B2 describes a general-purpose tool for analyzing natural language text for natural language understanding (NLU) applications. The natural language understanding apparatus analyses a source text and creates a semantically interpretable syntactic representation (SISR) with a syntax template and semantic clause annotations. The general-purpose natural language understanding equipment can be used for query responding, translation, summarization, information extraction, disambiguation, and parsing. The natural language query response apparatus uses the general-purpose apparatus to turn the query into a SISR format. The general-purpose equipment for developing NLU applications transforms natural language source text into a semantically interpretable syntactic representation (SISR), or a "target" representation. The SISR format converts source text semantics into standard templates and fields for NLU applications. Though this patented invention describes a general purpose, this is heavily dependent on a template-based approach, and the output is in a specific target format. The new invention disclosed herein carries no dependence on templates or template-based infrastructures. Template-based logic restricts a universal application approach, and always requires a template to achieve an operation. The new invention disclosed herein is not application specific and is universal meaning and grammar based.

[U.S. Pat. No. 9,594,745B2] US Patent No. U.S. Pat. No. 9,594,745B2 describes a natural language understanding system enabled to generate a semantically detailed parse tree for each acceptable interpretation of an input natural language expression (or fewer such parse trees than interpretations) by independently solving sub-trees corresponding to various series of post nominal modifiers and associating those partial solutions with corresponding nodes of the overall parse tree. This approach is computationally expensive and works only within a specific domain for which it is enabled. The new invention as disclosed herein is based on grammar to understand domain, context, and intent in a general sense. In a key embodiment of this invention, context is based on personal History of Change and intent, along with context in time, and leads to operable meaning.

This invention's semantic database is graph based and reduces computational complexity by reducing the size of knowledge.

[U.S. Ser. No. 11/403,466B2] US Patent No. U.S. Ser. No. 11/403,466B2 describes a method which receives a first audio input from a user's client system. Numerous automated speech recognition (ASR) engines generate multiple transcriptions of the first audio input. Each ASR engine has a domain. The method involves associating each transcription with one or more intents and slots. A meta-speech engine selects one or more intents and slots to associate with the first user input. Method includes creating a response to the first audio input based on selected combinations and delivering instructions to the client system. Accuracy of ASR is based on multiple ASR engines and the output is sent to a meta speech engine. This method is computationally expensive, and by no way ensures input accuracy. In the new invention disclosed herein, this is handled by a unique model which is derived from an input, which can reference or include a user's personal History of Change and a global model. This new invention includes a language model which corrects the errors in ASR based on context in time, predicting the right word and removing disambiguation.

[U.S. Pat. No. 9,792,904B2] US Patent No. U.S. Pat. No. 9,792,904B2 describes a statistical model for a natural language understanding application using human knowledge and applies a sequence-to-sequence model for a specific application. This invention is not scalable, as it needs human curated knowledge for specific application and fails in unknown domains. This invention does not generalize how its principles can be applied to a general language model. In the new invention disclosed herein a language model derives a meaning which can be utilized in a virtually infinite number of ways, like but not limited to, an operating system or the development of a new application.

[U.S. Ser. No. 10/304,444B2]U.S. Ser. No. 10/304,444B2 describes methods based on combinations of speech recognition and natural language processing techniques which enable speech-based user control of a computing device to execute tasks based on the user's spoken commands. This invention is specific to commands and a domain and is not a general purpose NLU. This process would fail in multiple domains, as the meaning always differs, based on domain and context in time. In the new invention disclosed herein, domain, context in time and meaning are factors of consideration, and in a key approach, are an integral part of the meaning operated by the system.

DESCRIPTION OF FIGURES

For a more complete understanding of the present disclosure, reference is now made to the following Discussion of the Figures taken in conjunction with accompanying figures.

DEFINITION OF TERMS

Figure 1A:
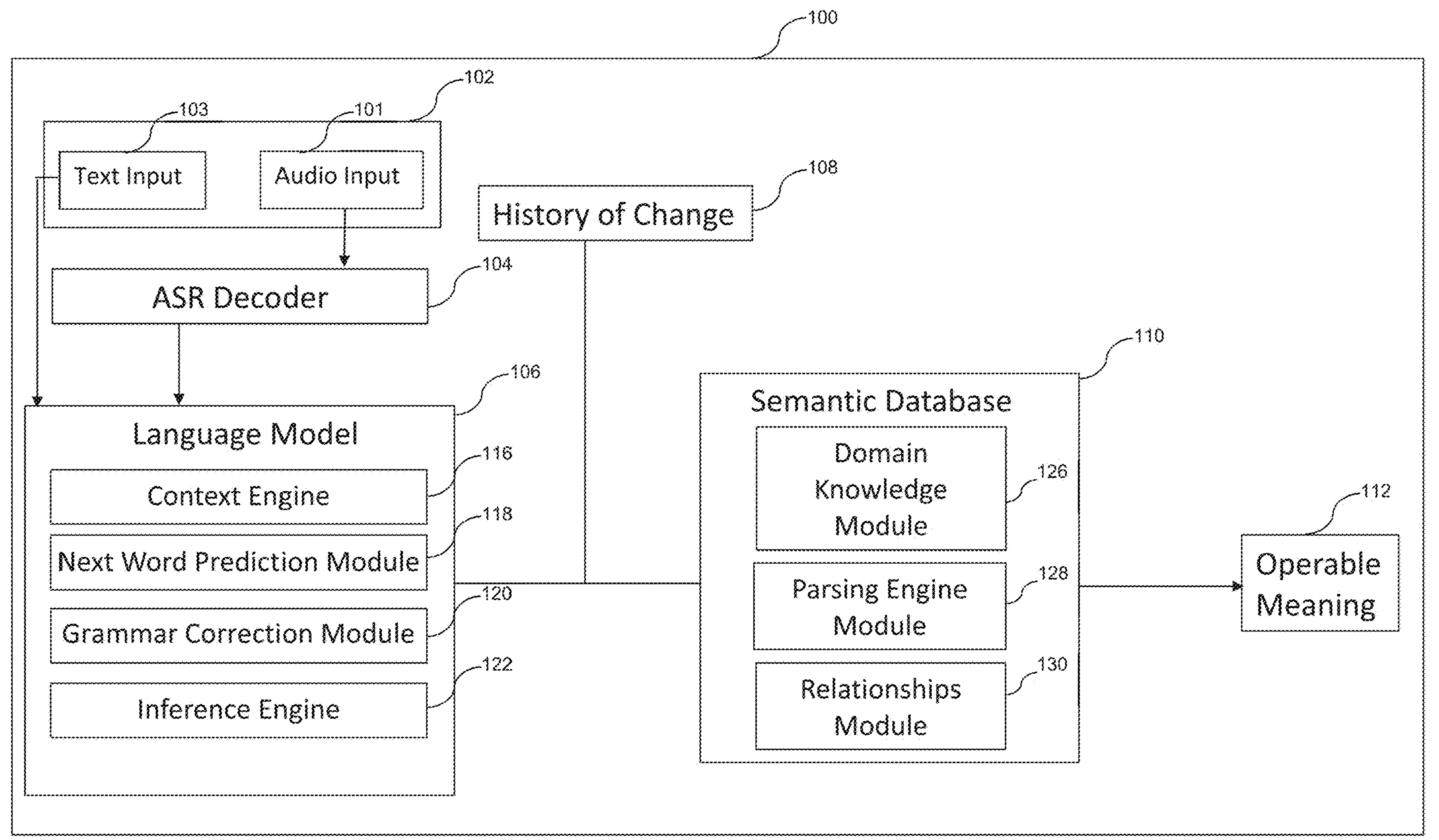
FIG. 1A: Illustrates a system for configuring and operating a system to parse incoming input and produce an operable meaning.

Characteristic—As a general reference, the term characteristic includes, but is not limited to:

i. Any attribute, property, behavior, function, operation, action, definition, condition, procedure, process, quality, or the like.
ii. Any location.
iii. Any position, including any 2D or 3D position.
iv. Any timed event or its equivalent.
v. Any way or means, e.g., the way or means that a meaning is affected by an input, context, communication and the like.
vi. The manner of any response.

History of Change—A construct that chronicles all change to data, or the equivalent, such that said data can be navigated, interrogated, modified, acquired and utilized as content (which can be a meaning), and/or a programming tool by a user or other means.

A History of Change includes, but is not limited to: (a) changes to characteristics that define operations, and the results of these operations, performed as part of the completion of a task or purpose, (b) change data that defines the "State 1" of a set of data, (c) change data that defines "State 1" to "State n" of a set of data, and/or (d) change data that defines change at points in time defining any motion, action, operation, function, procedure, activity or any equivalent.

The term History of Change also refers to changes to the states of characteristics, relationships and meaning at points in time. These changes can be caused, in part, by: (a) user input, (b) context, (c) an event or condition (d) communication from an organization of programmable data, and/or (e) communication from an external source, e.g., a cloud-based service.

There are two general types of History of Change: (a) the History of Change for data content, and (b) a personal History of Change for an individual user.

A History of Change can be acquired and saved as a separate content, which can be used, in whole or in part, as a programming tool.

Input—The word input as used in this disclosure includes any input presented or otherwise existing in the digital domain and in the physical analog world. Digital inputs can include any data (which can be a signal, condition, purpose, method, action, procedure, characteristic, relationship, meaning or an equivalent) that is activated, outputted to an environment or to an element or to any item that can receive data, or be called forth or presented by any means, including, but not limited to: typing, touch, mouse, pen, sound, voice, context, assignment, relationship, time, motion, position, configuration, visual presentation to a camera or other such visual computer device, further including the manipulation, programming, operation (or an equivalent) of any data via any means, including via software and/or hardware means, including virtual reality devices, augmented reality devices, and more.

Inputs can also be from the physical analog world as anything recognized by a digital system. Such inputs include, but are not limited to: body movements (e.g., eye movements, hand movements, body language), temperature (e.g., room temperature, body temperature, any environment temperature), physical elements that are presented or moved in some fashion (e.g., showing a picture to a camera-based computer recognition system), location (e.g., GPS signals), proximity (e.g., one element impinging another in a physical space) and more. An input can be produced by many means, including: user input (e.g., a person interacts with an environment to cause something to happen), a software input (e.g., software addresses data or analyzes characteristics, relationships and other data to produce a result), context (e.g., the existence of one or more elements produces a recognized response), time (e.g., events occur based upon the passage of time), configuration (e.g., presets determine one or more inputs), or any equivalent.

Meaning—This refers to characteristics and/or relationships that define visual, functional, conceptual or any other data at any point in time.

Known Meaning:

In a first embodiment, any knowledge, understanding, recognition, awareness, intelligence, learned information, behavior, methodology, perception, realization, distinguishment, cognizance (and any equivalent), existing as a part of and/or associated with the Semantic Database of the system of this invention. In a second embodiment, the associations between relationships which define said first embodiment. In a third embodiment, any understanding or meaning, applicable by the system of this invention to the programming of a target, which could be another meaning. In a fourth embodiment, an understanding of the meaning of an input at any point in time, according to any context of use. In a fifth embodiment, the understanding of any action, function, operation, concept, agency, process, procedure, motion, service, and the like, according a context in time. In a sixth embodiment, the understanding of said fifth embodiment without reference to a context in time. In a seventh embodiment, knowledge of factual and fictional information known to exist in any field of understanding or use. In an eighth embodiment, the individual data and meaning saved, applied, stored or otherwise associated with Histories of Change pertaining the users of the system of this invention. In a ninth embodiment, the collective of characteristics, relationships and meaning saved as the History of Change for content, including meaning content of the system of this invention. In a tenth embodiment, any existing operable meaning created by the system and operated by any input to said system.

Operable Meaning:

In a key embodiment, an operable meaning is an understanding defined by at least one characteristic, which defines at least one relationship, which defines at least one meaning at a point in time according to a context of use. In another embodiment, an operable meaning can be any meaning existing in and/or associated with the Semantic Database of the system of this invention. This meaning includes, but is not limited to: any context, content, concept, function, action, event, cause, state, condition, existence or any equivalent.

Relationship—This term includes any comparative meaning between any two or more: characteristics, relationships and meanings, including the comparative meaning between any content (including data tools), data presented by one or more data elements, or their equivalent, and the shared meaning between a user and data operated by a user.

In a key embodiment of the system of this invention a user input includes at least one of the following:

(a) The digital and/or analog manipulation, programming, modification or transformation of data elements or any equivalent.

(b) The presentation of instructions to the ASR Decoder, or other input means, to the system of this invention via verbal, written and/or gestural communications.

(c) The presentation of illustrations, examples, characterizations and representations which define a context-of-use.

The following presents a disclosure of key aspects of a new NLU and semantic database system, referred to herein as "the system of this invention", and as "the system."

A general-purpose system for analyzing natural language text that facilitates the development of a wide range of applications in natural language understanding is described. A natural language understanding (NLU) system based on the idea of a domain and context in time that effects NLU outcomes. The system employs a graph-based representation of entity kinds, characteristics, and their interactions within a certain domain, as well as trained models associated with those graphs, to derive meaning at a context in time. The approaches categorize, derive, and determine the appropriate meaning for incoming text depending on the domain and context. Thus, the system works in a domain particular to context in a multi-domain architecture NLU processing where a system identifies the specific domain, deduces the operable meaning, and establishes a plan of action.

A first aspect of the present invention relates to a device for processing input received by the device. The apparatus comprises one or more processors, an input interface configured to accept an input and generate a digital signal corresponding to the input, plus memory containing instructions executable by one or more of the processors. The instructions, when executed by one or more of the processors, extract text, based on a generated digital signal. A system processes this text using a domain-specific model and a context-specific linguistic model to produce one or more linguistic processing results for the text.

A second element of the system of this invention describes a method for processing text, corresponding to input(s) received by a computer. Said input is received by an input interface of the computing device, which generates a digital signal matching the input. Text corresponding to the input is generated, and processed using a domain-specific linguistic model and a context-specific linguistic model to produce one or more linguistic processing outputs for the text. The linguistic processing results may include a tokenization for a section of the text, a normalization for a portion of the text, a sequence of normalizations for a portion of the text, or any combination thereof.

A third aspect described herein provides a non-transitory computer-readable media containing instructions executable by a computing device's processor. The instructions, when executed by the processor of the computing device, allow the computer device to execute steps for producing a natural language understanding recognition result in response to speech input received by the computing device. The speech input is received by an audio input interface of the computer device, which generates a digital signal corresponding to the speech input. Text is generated corresponding to the speech input, and the text is processed using a domain-specific linguistic model and/or a context-specific linguistic model to generate one or more linguistic processing outcomes for the processed text. Text and linguistic processing findings are processed with a natural language understanding model to produce a natural language understanding recognition result and, in some situations, an Operable Meaning. The recognition result for natural language comprehension includes at least one purpose and at least one mention relating to the text generated from the digital signal. The outcome of the natural language understanding recognition is sent to a central server application for further processing.

In one embodiment of the invention, a domain-specific linguistic model comprises linguistic information applicable to a single domain, whereas the context-specific linguistic model includes linguistic information suitable to a specific context. A portion of the linguistic information in the context-specific linguistic model may be derived from several knowledge sources, including but not limited to: a knowledge graph, free text, ontology, and a context-specific lexicon. The domain-specific and context-specific linguistic models may obtain their linguistic information from distinct knowledge sources. The domain-specific linguistic model and context-specific linguistic model can be incorporated into a single composite linguistic model. A model for natural language comprehension can be trained utilizing the text, its linguistic processing results, and the text's annotations.

In another embodiment of the invention, some implementations provide a method for understanding and producing an operable meaning. The method of the invention is performed not limited to, a mobile device or a computing device including one or more processors and memory storing instructions for execution by the one or more processors. Said method includes a speech recognition model and/or a language model. Said method further includes the analysis of input from one or more microphones or text input from a user.

In another embodiment of the invention, some implementations provide a method to optimize the model performance and implement a user model. Said method reduces the burden on a global linguistic model and thus reduces computational complexity, time, and resources.

Another embodiment of the invention employs a method to obtain, retain and update the knowledge in a semantic database where the data is secured from a plural of reliable sources in the form of structured, unstructured, and semi-structured data. Said method includes a sub-method to process the data, which is not limited to pats of speech tagging, lemmatization, noisy entity removal, stop words removal, normalization, word standardization. Said method presents a clean text that is consumable for further methods or processes. Said method retrieves the entities, attributes, and relationships and an "a=n" exhaustive lookup table is generated and acts as index for the global knowledge. Said method comprises of disambiguation filter, relevant domain tagger and context tagger and removes ambiguity for a word or a sentence and produces a clear word sense, atomic entities with attributes and their relationships.

Another embodiment of the invention employs a method to retrieve the information from a global semantic database for which input is a multiple of a domain, context, entity, and parsed meaning. Said method receives the input from a linguistic inference engine and starts processing the data dispatches which acts as a bridge between global semantic database, data store for further processing and a job manager. A Data Dispatcher identifies the indexes and locates the right part of the database that needs to be processed and also decides on how to process either a single node or multiple nodes to retrieve the right information. The Data Dispatcher is responsible for retrieving the data and storing it in a datastore. The Data Dispatcher also updates the Job Manager with the right sequence of data to perform. Said method employs a Job Manager, which allocates the sequence and data location to the computing engine which via an Output Consumer module (which collates and summarizes the output of the Job Manager) presents an output to the user.

In an embodiment of the invention, a computer-implemented method includes operating a natural language understanding process utilizing at least one of a Machine Learning Model and a Deep Learning Model that generates at least one of the following: entities, attributes, relationships and meaning, connected through at least one of a domain and a context in time, producing an operable meaning. Said natural language understanding process includes utilizing said entities, attributes, relationships and meaning as searchable data, presenting an input to be understood by a computing system and presented as a grammatically correct syntax based on said at least one of said domain and said context in time, and extracting at least one of an entity, attribute, relationship and meaning in association with said grammatically correct syntax, where said at least one of said entity, attribute, relationship and meaning is stored as semantic data knowledge.

In an embodiment of the invention, said semantic data knowledge is obtained and updated from different structured, unstructured and semi structured data.

In an embodiment of the invention, said extracting said at least one of said entity, attribute, relationship and meaning does not employ a template.

In an embodiment of the invention, said searchable data is not keyword based.

In an embodiment of the invention, the computer-implemented method further includes defining a round trip of processing the input, which includes at least one of: Active Speech Recognition, Language Modelling, Information Retrieval, Natural Language Understanding, and outputting data.

In an embodiment of the invention, said round trip is less than or equal to 2.6 Pico seconds.

In an embodiment of the invention, said at least one of said entities, attributes, relationships and meaning is based on an intent of said context in time.

In an embodiment of the invention, operating said natural language understanding process is executed by a supercomputer.

In an embodiment of the invention, a non-transitory computer-readable storage medium containing program instructions, wherein execution of the program instructions by one or more processors causes the one or more processors to perform steps comprising operating a natural language understanding process utilizing at least one of a Machine Learning Model and a Deep Learning Model that generates at least one of the following: entities, attributes, relationships and meaning, connected through at least one of a domain and a context in time, producing an operable meaning. Said natural language understanding process includes utilizing said entities, attributes, relationships and meaning as searchable data, presenting an input to be understood by a computing system and presented as a grammatically correct syntax based on said at least one of said domain and said context in time, and extracting at least one of an entity, attribute, relationship and meaning in association with said grammatically correct syntax, wherein said at least one of said entity, attribute, relationship and meaning is stored as semantic data knowledge.

In an embodiment of the invention, said semantic data knowledge is obtained and updated from different structured, unstructured and semi structured data.

In an embodiment of the invention, said extracting said at least one of said entity, attribute, relationship and meaning does not employ a template.

In an embodiment of the invention, said searchable data is not keyword based.

In an embodiment of the invention, the steps further comprise defining a round trip of processing said input, which includes at least one of: Active Speech Recognition, Language Modelling, Information Retrieval, Natural Language Understanding, and outputting data.

In an embodiment of the invention, the round trip is less than or equal to 2.6 Pico seconds.

In an embodiment of the invention, said at least one of extracted entities, attributes, relationships and meaning is based on an intent of said context in time.

In an embodiment of the invention, operating said natural language understanding process is executed by a supercomputer.

In an embodiment of the invention, a system comprising memory and one or more processors configured to operate a natural language understanding process utilizing at least one of a Machine Learning Model and Deep Learning Model that generates at least one of the following: entities, attributes, relationships and meaning, connected through at least one of a domain and a context in time, producing an operable meaning. Said natural language understanding process includes utilizing said entities, attributes, relationships and meaning as searchable data, presenting an input to be understood by a computing system and presented as a grammatically correct syntax based on said at least one of said domain and said context in time, and extracting at least one of an entity, attribute, relationship and meaning in association with said grammatically correct syntax, where said at least one of said entity, attribute, relationship and meaning is stored as semantic data knowledge.

In an embodiment of the invention, said semantic data knowledge is obtained and updated from different structured, unstructured and semi structured data.

In an embodiment of the invention, the one or more processors are further configured to extract said at least one of said entity, attribute, relationship and meaning without employing a template.

In an embodiment of the invention, said searchable data is not keyword based.

DISCUSSION OF THE FIGURES

Regarding FIG. 1A, a user provides an input 102 to a system 100 for configuring and operating said system to parse incoming input and produce an operable meaning. The input 102 may include, for example, audio input 101, text input 103, and/or other input. The input, which may be decoded by an ASR decoder 104, goes to the Language Model 106, which extracts its context, performs error correction based on next word prediction and grammar correction. This provides a context domain and grammar for an Inference Engine 122, which queries the user's personal History of Change 108, and acquires the user's context of use at the point in time of said user's input to the system. The system 100, can be accessed, operated, and/or implemented using one or more computing devices (e.g., computers, including but not limited to: supercomputers), handheld devices, telephone computer systems, kiosks, and/or a vast array of other devices).

In some embodiments, the Language Model 106 accesses a Semantic Database 110, and acquires information that is relevant to the meaning of the user's input 102, which is the output of the Language Model, modified or otherwise affected, or verified, by any relevant information saved to the user's personal History of Change 108. In some embodiments, the user's personal History of Change 108 is stored in a computer readable storage medium, which can be an electronic, magnetic, optical, electromagnetic, infrared, or semiconductor system (or apparatus or device), or a propagation medium. Examples of a computer-readable storage medium include, without being limited to, a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

From this information, the system 100, (e.g., an artificial intelligence (AI) engine) constructs an Operable Meaning 112. In one embodiment, an operable meaning is a meaning, which can receive an input, which in some way addresses and/or affects said operable meaning. This addressing of an operable meaning can include, but is not limited to: causing a modification to any characteristic, relationship and/or meaning of said operable meaning.

In further reference to FIG. 1A, the Semantic Database 110 is comprised of three modules: (a) a Domain Knowledge module 126, (b) a Parsing Engine module 128, and (c) a Relationships module 130. These modules work together to produce a process referred to herein as Information Retrieval. Information Retrieval is a process by which the Language Model 106, upon receiving an input from the ASR Decoder 104, or as the text input 103, presented directly to the Language Model 106, applies one or more modules to said input to define its meaning. In a key embodiment of the system, shown in FIG. 1, four modules of the Language Model (a Context Engine 116, a Next Word Prediction module 118, a Grammar Correction module 120, and an Inference Engine 122) are applied to said input to define its meaning.

The Information Retrieval process begins upon the receipt of an input by the Language Model 106. The Output of the Language Model includes processing of said input by the context engine 116. This processing determines the meaning of said input at a point in time or for a duration. In some embodiments, the output of the Language Model's Inference Engine 122 is meaning. In this case, it's the meaning of said input to the ASR Decoder 104, and thus to the Language Model. In a key embodiment of the Language Model, the Context Engine 116, the Next Word Prediction module 118, and the Grammar Correction module 120, operate concurrently. However, based on the complexity of an input to the system, and/or the load presented to the system at a point in time, these operations may occur sequentially or as a combination of concurrent and sequential calculations.

In the Language Model 106, the Inference Engine 122 receives at least one output from the Context Engine 116, the Next Word Prediction module 118, and the Grammar Correction module 120. For example, the Inference Engine receives a context corrected sentence and context in time from the history of change 108 from the Context Engine. Further, the Inference Engine 122, receives an input from the Next Word Prediction Module 118, and the Grammar Correction Module 120.

In some embodiments, the Context engine 116 obtains or generates the context of the input. The Next Word Prediction module 118 and the Grammar Correction module 120 correct the sentence with regards ambiguity, e.g., homonyms, anaphora, and contranyms. The Inference Engine 122 receives at least one context and one corrected text input from the Context Engine and the Next Word Prediction and Grammar Correction modules. The Inference Engine converts these inputs to one or more meanings.

In some embodiments, either concurrently or sequentially, the Inference Engine 122 correlates its received information, including context in time, to the History of Change 108, for the Semantic Database 110. This Semantic Database is the sum total of known meaning for the system of this invention. In this example, the Inference Engine via the use of indexes, or the equivalent, in the Semantic Database, identifies and/or acquires at least one meaning in the Semantic Database, which is relevant to the meaning presented to the Inference Engine by the Context Engine 116, the Next Word Prediction module 118, and the Grammar Correction module 120.

This process identifies at least one meaning (existing as known meaning in the Semantic Database 110), which is to be acted upon by the meaning output of the Inference Engine 122.

In one embodiment, this identified meaning of the Semantic Database 110 and the meaning output of the Inference Engine 122 are sent to the Semantic Database for processing. In another embodiment, said identified meaning and said meaning output of the Inference Engine are combined or otherwise produced as a collective meaning, which is sent to the Semantic Database for processing.

In another embodiment, said identified meaning and said meaning output of the Inference Engine 122, are represented as one or more relationships, which are sent to the Semantic Database 110 for processing.

FIG. 1A illustrates one embodiment of the system of this invention where the Semantic Database contains three elements: (a) the Domain Knowledge module 126, (b) the Parsing Engine module 128, and (c) the Relationships module 130.

In some embodiments, the input to the Semantic Database 110 is divided into two meaning categories: (a) the meaning output of the Inference Engine 122, and, (b) one or more meanings identified in said Semantic Database or associated with said Semantic Database, which are relevant to the Inference Engine meaning, the "a" meaning is used to modify, process, alter, or in any way program the "b" meaning.

In some embodiments, the input to the Semantic Database 110 is a collective meaning comprised of one or more relationships between the meaning output of the Inference Engine 122, and one or more identified meanings, which are relevant to the Inference Engine's meaning output, these relationships are processed by the Semantic Database 110, where at least one meaning parameter is changed.

In some embodiments, the Domain Knowledge module 126 of the Semantic Database 110 defines the identified meaning of the Semantic Database as a domain. A domain can be any category, sub-category, idea, method, procedure, function, element, process or any equivalent.

As an example only, let's say an input states: "I like Apple." The domain is technology; it could be an Apple computer or an Apple mobile phone. If the context pertains to mobile phones (for example, let's say an Apple phone is presented to the digital camera input of the device being utilized to present input 102 to the system 100, and this phone is referenced by said verbal input), the context is Apple mobile phones.

As a modification to this example, let's say an input states: "I like apples." The domain is fruit. It could be Macintosh, Envy, Gala, Fuji or any type of a wide variety of apples. If the context pertains to a certain growing method, e.g., organic, the context is any apple produced organically.

In some embodiments, the Relationships Module 130 builds relationships between entities and attributes of Semantic Database meaning. These relationships could be domains, or contexts or direct primary relationships or secondary relationships or any other valid relationship.

In a key embodiment of the system of this invention, these relationships are one or more relationships that can exist at or be associated with the context in time defined by the Context Engine 116, of the Language Model 106, based on an input to the ASR Decoder 104, and which are at least, in part, defined by or are relevant to the output of the Next Word Prediction Module 118, and the Grammar Correction Module 120, at that same context in time.

In some embodiments, the Parsing Engine module 128 processes the output of the Domain Knowledge module 126, and the output of the Relationships module 130, and produces or otherwise presents a combined meaning, collective meaning, or an equivalent, and outputs this meaning as an operable meaning.

In some embodiments, the ASR Decoder 104, the Language Model 106, the Context Engine 116, the Next Word Prediction Module 118, the Grammar Correction Module 120, the Inference Engine 122, the Semantic Database 110, the Domain Knowledge module 126, the Parsing Engine module 128, and/or the Relationships module 130 are accessed, operated, and/or implemented using one or more computing devices (e.g., computers, including but not limited to: supercomputers), handheld devices, telephone computer systems, kiosks, and/or a vast array of other devices).

Figure 1B:
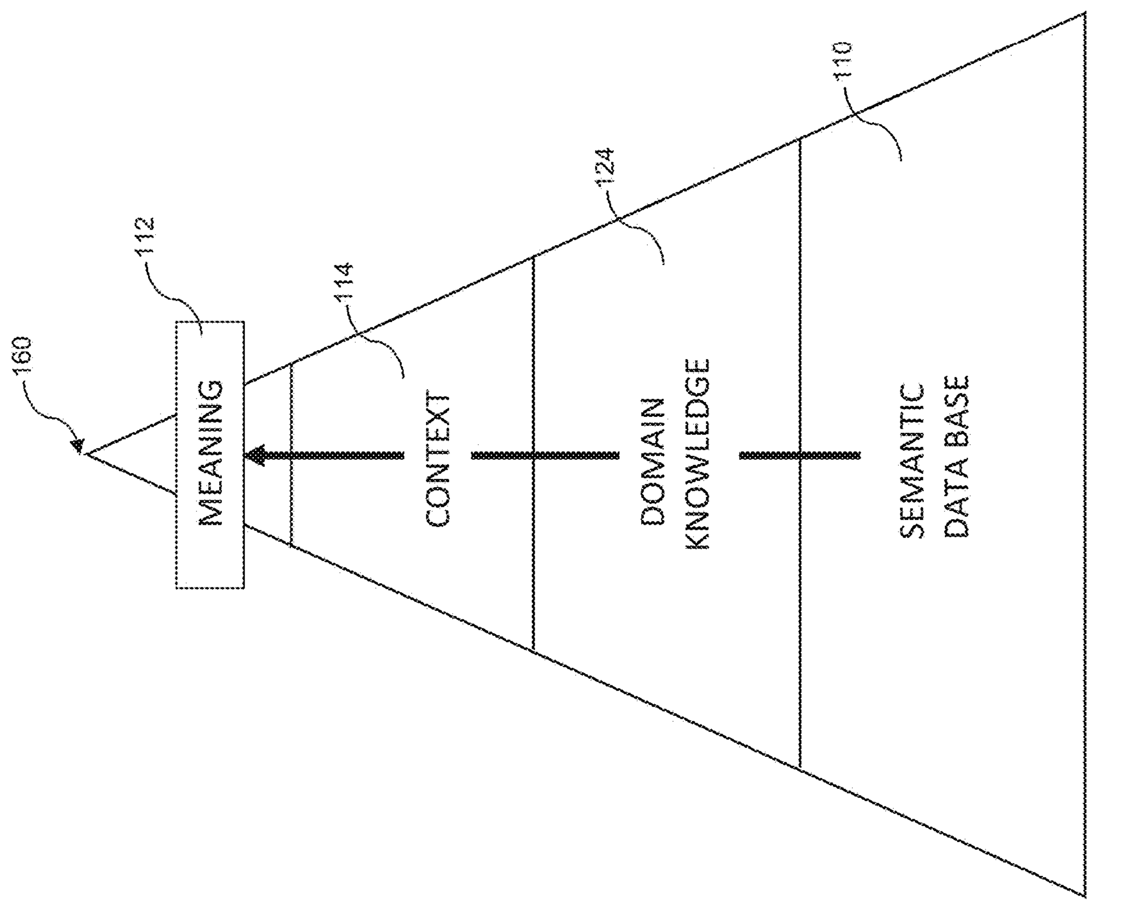
FIG. 1B: Illustrates an example of the reduction of a relevant meaning.

FIG. 1B further illustrates the process whereby the meaning output of the Inference Engine 122 is utilized by the system 100 of this invention to act upon, modify, quantify, alter, or in any way affect one or more relevant meanings identified, via indexes or other viable means known to the art, in, of, or otherwise associated with said Semantic Database 110. As a part of this process, the scope of said Semantic Database is reduced to a size less than its whole.

As a function of this method, the system 100 retrieves relevant meaning from said Semantic Database 110. The relevance of this relevant meaning may be anything that defines said relevant meaning as a valid programming target, or otherwise enables the output meaning of the Inference Engine 122, to be utilized in any way to act upon said relevant meaning.

Said relevant meaning may be associated explicitly or implicitly or via any means with a piece of content, presented to the ASR Decoder 104, and related in some way to an Audio or Text input 102, to the system of this invention. In one embodiment of the system, the appropriateness or relevance of said relevant meaning to said content material is based on its context within one or more knowledge domains. According to this method, the scope of the Semantic Database meaning is reduced or filtered by parameters pertaining to at least one domain and/or context which acts as a means to filter said identified meaning of the Semantic Database 110.

In one embodiment of the system 100 of this invention, an output meaning 112 shown at the top of the pyramid 160, in FIG. 1B, is reduced from the whole of the Semantic Database 110. To reduce said whole to a relevant meaning, the data comprising the Semantic Database is filtered according to its relevance to the Domain Knowledge 124, using the Domain parameter(s) of the Domain Knowledge module 126 of the Semantic Database. This reduced knowledge is further reduced using context 114. The system of this invention processes the knowledge obtained from this method to produce an exact meaning. This process is carried out by the Domain Knowledge module 126, the Relationships module 130, and the Parsing Engine module 128.

Of note, in a key embodiment, the process described in FIG. 1A is initiated when the Context Engine 116, outputs a meaning to the Inference Engine 122, and ends when an Operable Meaning 112 is presented by the system of this invention.

Figure 2:
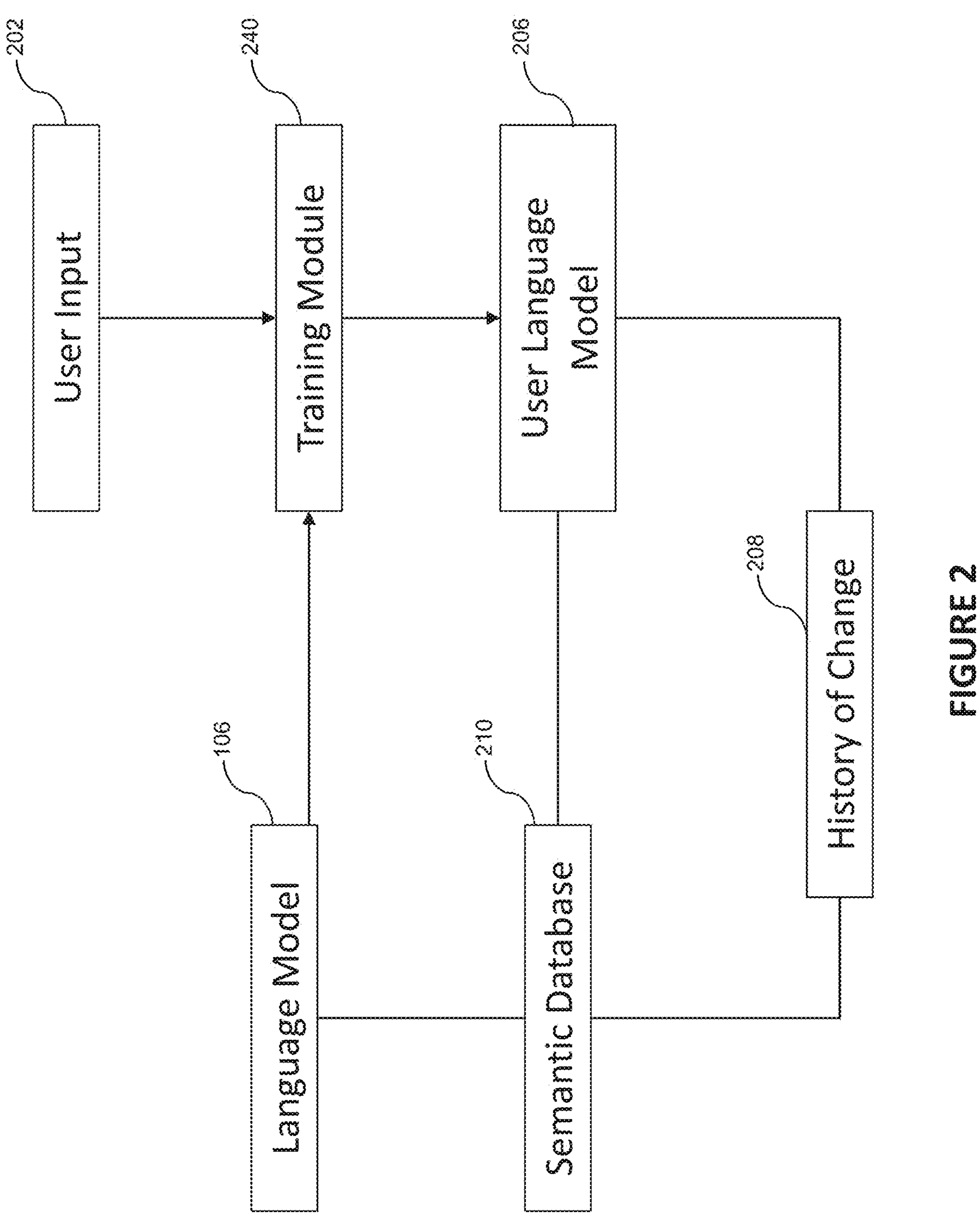
FIG. 2: Depicts the creation and improvising of a user specific model.

FIG. 2 is a diagram of an example of the creation of a unique language model for an individual user of this invention. In a key embodiment of this invention, each user input 202 generates a unique User Language Model 206. Referring again to FIG. 1A, a larger language model 106, is addressed by the ASR Decoder 104. The User Language Model 206 shown in FIG. 2 is similar to the larger model 206 produced according to the method defined in FIG. 1A, except that the individual user's input trains this model again. The user's input addresses the existing model's total meaning as defined by the user's input to the ASR Decoder, subject to any relevant meaning in this user's person History of Change 208, and the relevant information accessed in a Semantic Database 210, which may be similar to or the same as the Semantic Database 110 depicted in FIG. 1A.

In further reference to FIG. 2, the Language Model 106 presents an input to a Training Module 240. The Training Module receives the user input 202, which can be any information, supplied by said user at a point in time. This information can include, but is not limited to: definitions, intent, ideas, procedures, concepts, or any other information presented by said user at a context in time. The Training Module utilizes this information to modify, alter or in some way affect, or verify the information presented to it by the Language Model 106.

The User Language Model 206, continues to process data as presented by additional user input 202, and as a result, updates itself with new information and presents this new information to the system 100, which uses it to update or replace the Language Model 106 that is acted upon or otherwise affected by the meaning of said user's input(s). [Note: in a key embodiment said meaning of said user's inputs are the output of the Inference Engine 122] This process is carried out time and time again, depending on the receipt of additional inputs 202, from said user to the system 100. Note: The User Language Model's output is specific to the user presenting inputs to the system 100, at points in time.

In a key embodiment of the invention, the method of FIG. 2 is carried out concurrently with the method defined in FIG. 1A and/or FIG. 1B. Note: as an alternate, this method can be carried out sequentially or as a combination of the two. In both cases, this produces the User Language Model 206, uniquely defined by the meaning of a user's own input at a point in time to the system 100.

For the purposes of illustration only, the User Language Model 206 created in this way could be a thousandth to a millionth (or less) the size of the model originally created by the user's input to the system 100, as shown in FIG. 1A Some of the advantages of this approach are: it is fully scalable and the operations can be performed by the software of this invention in a much shorter period of time, e.g., in one one-thousandths of the time. Also, said model improves the accuracy of the understanding of the meaning of the user's input to the system. Plus, this model is fine-tuned for the specific user presenting an input to the system at a point in time. Note: this input may or may not be further defined by a context of use.

In one embodiment of the invention, a personal History of Change 208, an addition to a personal History of Change, a modification to a personal History of Change, or any equivalent, is created which represents a unique language model for a specific user. This approach can be applied individually to any and all users who present an input to the ASR Decoder 104, of the system of this invention.

This method improves accuracy by clarifying or precisely identifying the exact data in the Semantic Database 210, which must be parsed by the system 100, and acted upon by the data, which can be a meaning or meanings, defined by a user's input to the system.

In some embodiments, the User Language Model 206, the Semantic Database 210, the Training Module 240, and/or the Language Model 106, are accessed, operated, and/or implemented using one or more computing devices (e.g., computers, including but not limited to: supercomputers), handheld devices, telephone computer systems, kiosks, and/or a vast array of other devices).

Figure 3:
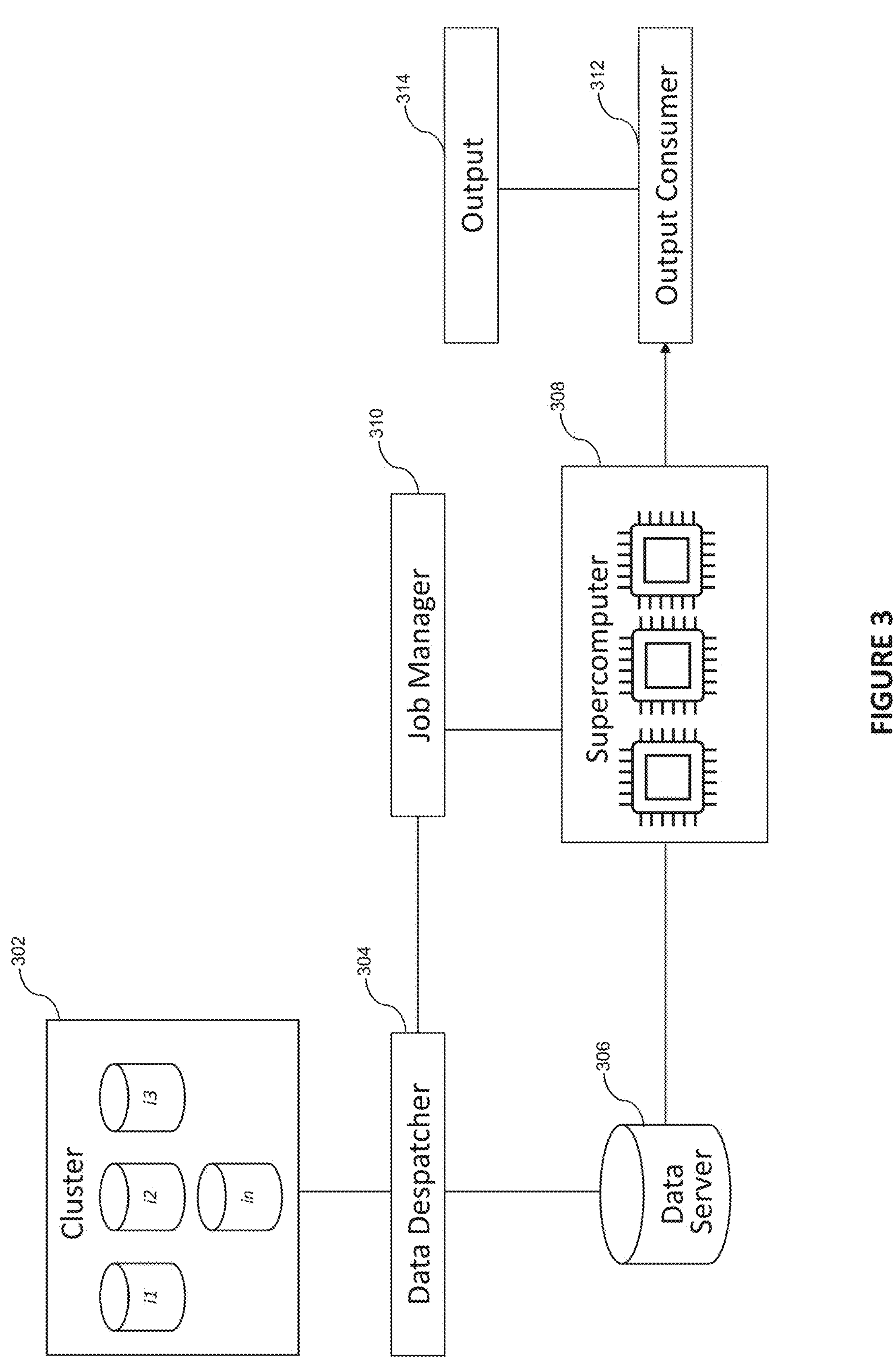
FIG. 3: Depicts an example of information retrieval and processing.

FIG. 3 illustrates an example of how a process of this invention is executed. An input data cluster 302, (which can be a context, domain and/or meaning of any complexity) is input to (passed to) a Data Despatcher 304.

In the Cluster "i1, i2, i3 to in" are instances of a Semantic Database (e.g., the Semantic Database 110 depicted in FIG. 1A). In one embodiment of the invention, "i1, i2, i3 to in" are identical data of the Semantic Database. As an example only, let's say there are 1000 nodes that must be extracted.

Let's consider an example of three patent documents, which are based on natural language processing (NLP). Based on an input or any data having a relationship to these three patent documents, what is needed is only a small part of what is written about natural language understanding (NLU) in these documents. In order to acquire meaning, the system needs the text related to NLU first, plus the meaning of the assessed text. For the purpose of an example only, consider the existence of a single node. In one approach, regarding this node, the software of the invention goes through each of the three documents. This process can be carried out sequentially, concurrently or via a combination of the two. Let's say the process is carried out sequentially. As a result, the software of the invention accesses each of the three documents one by one and extracts the information relevant to the meaning of an input to the system. The software of this invention distributes the work load to three different nodes, where the documents are parsed, and the relevant information is retrieved parallelly and stored in a suitable storage medium for further processing.

In one embodiment of the invention, the Semantic database data is stored in the form of graphs. Once the domain and context are parsed, a database index instructs which node in the graph to start. Each node can have branches and children connected through lines called edges. In this case, the complete knowledge graph is broken into 3 smaller pieces and processed in parallel according to relevant branches. Consider in FIG. 4, the box 420, labeled "Information Extraction." If this is considered as a node, the three boxes 422, 424, 426 entitled: "Entity Extraction", "Attribute Extraction" and "Relation Extraction" would be branches of the Information Extraction node. This method enables the system to produce a relevant output in less time.

In summary, this approach reduces both time and distributes the load. The Cluster 302 comes into existence based on any input, which in this example is a user input, to the system. This user input is saved to that user's personal History of Change. FIG. 3 illustrates how data is being parsed with the Semantic Database 110 of FIG. 1A.

As a key part of this method, data relevant to the meaning of a user's input which needs to be acted upon, programmed or in any way addressed, is located within the Semantic Database using indexes or their equivalent, and then duplicated multiple times. Note: this could be any number of times.

In one approach this data is duplicated three times. This data is multiplied so it can be parsed as part of a parallel process. The Data Despatcher 304 determines which parts of this data are being acted upon, or utilized in any way by any means.

Referring again to FIG. 1, the Inference Engine 122 presents the meaning, shown in FIG. 3 as the Cluster, to the Data Despatcher 304.

Referring again to FIG. 3, a Data Server 306 is presented in some proximity to a computer, for example, a Supercomputer 308. The purpose of this data server is for saving data. The Data Despatcher 304 brings in the meaning, which can be the information retrieved from the Semantic Database. The Data Despatcher informs or tells a Job Manager 310, what needs to be done in what sequence or according to a set of concurrent computations.

The Job Manager 310 processes the data using the Supercomputer 308. Another module, e.g., an Output Consumer Module 312 takes or receives the outputs from the Supercomputer and presents them as an output 314.

Note: the placement of the Data Server 306 in close proximity to the Supercomputer 308 may reduce the total read/write time of the Supercomputer.

Further, regarding the method defined in FIG. 3, a user input could define a certain meaning or meanings, which require certain Semantic Database data relevant to this meaning or meanings. As an example, only, let's say there are 1000 documents in the Data Server 306. Let's further say the processing identified by the Data Despatcher 304, only requires the data defined in one tenth of a first document and one tenth of a second document. The Data Despatcher takes these two parts and puts them into the Data Server and informs or tells the Job Manager 310, to take the first part first, process it, and then take the second part and process it. The Job Manager performs this sequence. So, in reference to the main Semantic Database, only two very small sections of data, or meaning, are required to complete a process.

In one embodiment of the invention, the supercomputer 308 supplies processing power, but the storage and the tool that performs specific parsing of data relevant to the meaning of user inputs, or inputs from other sources to the system, runs on the Cluster 302.

In some embodiments, the data despatcher 304, the job manager 310, the data server 306, and/or the Output Consumer Module 312 are accessed, operated, and/or implemented using one or more computing devices (e.g., computers, including but not limited to: supercomputers), handheld devices, telephone computer systems, kiosks, and/or a vast array of other devices).

Figure 4:
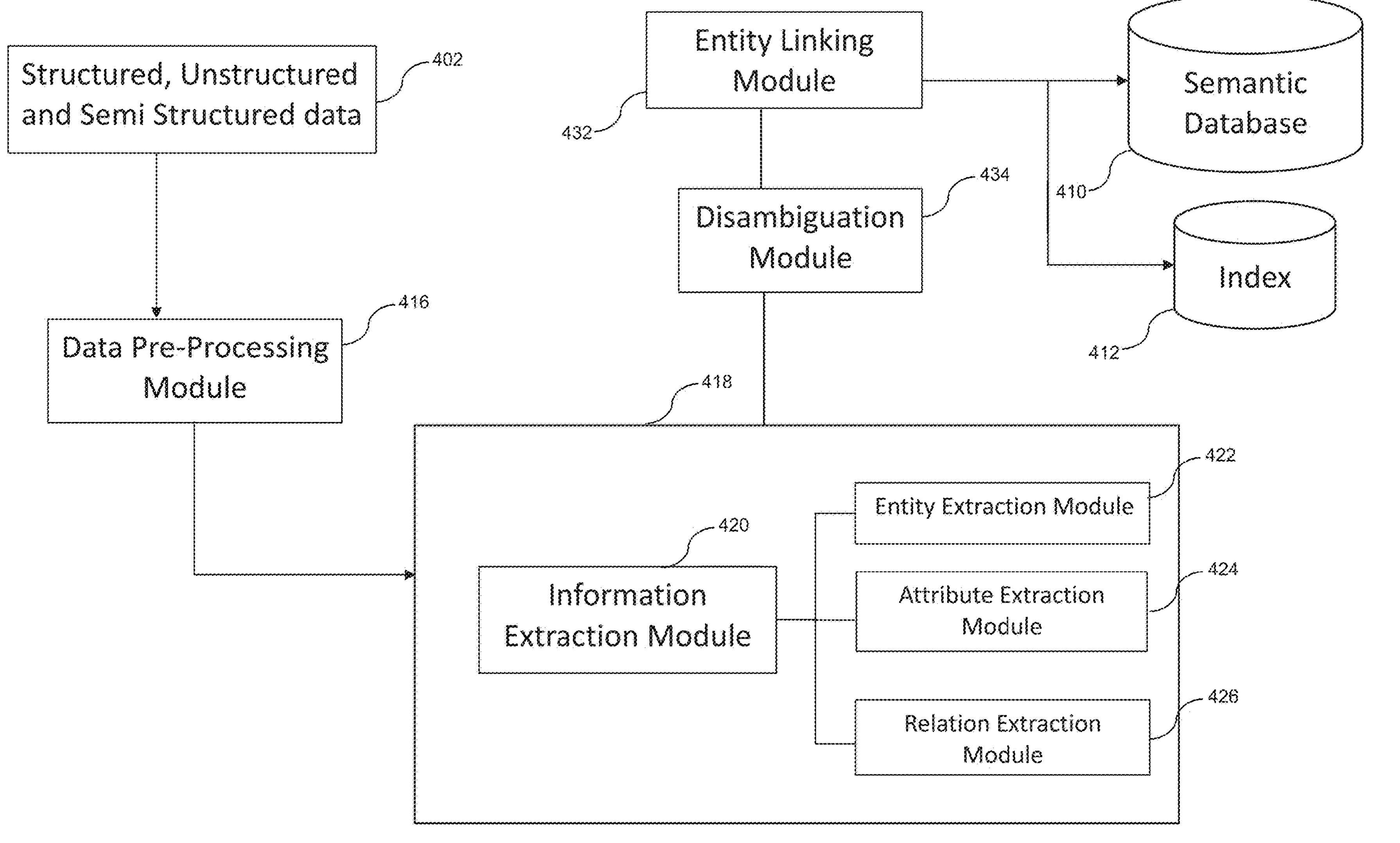
FIG. 4: Illustrates an example of the collecting and storing of knowledge in the system's Semantic Database.

FIG. 4 depicts an example of the collecting and storing of knowledge of a Semantic Database 410 of the system. This figure shows how data is stored and updated. Regarding sources of data, they could be structured like a database, unstructured, like HTML, a book, or a document, or semi-structured, like a graph, a Jason file, or the like.

In one approach, entities, attributes and relationships are extracted from this information, removing the ambiguity of the information. For example, consider the sentence: "John is a brick layer. He is very experienced." The term "he" is connected to John. "John" is an entity.

This is a simple example of a logic by which entities are connected together so everything makes sense, for example, in a graph-based logic. This meaning is stored in the Semantic Database. When this data is stored in the Semantic Database 410, the index 412 of the Semantic Database is updated. In a key embodiment of the invention, new information used to update the Semantic Database 410, is tied to the personal History of Change of the user who presents an input, whose meaning caused the parsing of specific meaning within the Semantic Database according to the methods described herein. In a preferred embodiment, the Semantic Database has its own History of Change which includes all the information, data, meaning and any equivalent contained in, and/or known to the Semantic Database. We might think of this as a comprehensive meaning. This comprehensive meaning includes the characteristics, relationships, meaning and any equivalent, saved to each system user's personal History of Change. In addition, said comprehensive meaning includes the Histories of Change for every system-created content and environment.

In this approach, when a user presents an input to the system, the data and/or the data meaning of the user's input is saved to the user's personal History of Change, which becomes a part of the Semantic Database 410, either as a new entry, if the user is a first-time user, or as an update to an existing personal History of Change for an existing system user. Further regarding FIG. 4, in one approach, Structured, Unstructured and Semi Structed data 402, are connected to a data server, via the Cluster, shown in FIG. 3.

Structured data represents information that is meticulously organized, factual, and concise. It typically consists of letters and numbers that fit into table rows and columns. Typically, structured data exists in tables resembling Excel and Google Docs spreadsheets. Structured data is frequently referred to as quantitative data, which means that its objective and predefined nature enable it to be easily counted, measured, and expressed numerically. Thus, structured data is data that is well-organized and formatted accurately. A common form of structured data exists as a relational database management system (RDBMS) format, meaning the information is stored in tables with interconnected rows and columns.

Unstructured data lacks a predetermined structure and can exist in a variety of diverse forms. Unstructured data examples include, among others, images and text files, such as PDF documents, as well as video and audio files. Unstructured data is qualitative data that is subjective and interpretive. This information is often classified according to its characteristics and qualities.

The following is in regards to semi-structured data. A database schema defines how data is organized within a relational database; semi-structured data does not adhere to the structure of a tabular data model or relational databases because it lacks a fixed schema. Semi-structured data is information that has not been organized into a specialized repository, such as a database, but has associated information, such as metadata, that makes it more amenable to processing than unstructured data. Emails, XML and other markup languages, binary executables, TCP/IP packets, zipped files, data integrated from multiple sources, and web pages are examples of semi-structured data sources.

Data Pre-Processing

In one approach of a data pre-processing module 416, inputted data is "cleaned" by removing unneeded elements, such as, unnecessary text, words that are not relevant to the current context, and duplicated text which does not add value to the meaning of an input.

Pre-processing 416 can include a number of steps which perform various tasks, such as tagging relevant parts of speech, removing unnecessary punctuations, adjusting upper and lower-case letters, and removing "stop words." Stop words are common words like: "the", "and", "I", "is", "are", "in", "it", "a", "to", "that" and many more.

As is common in the art, data preprocessing is a critical phase of a machine learning model. As such, the performance of any machine learning model is significantly influenced by how effectively the raw data that is fed into it was cleaned and preprocessed.

Information Extraction

In a key embodiment of the system of this invention, information extraction is based on both context in time and the specific characteristics of a user.

One objective of Information Extraction is to match the correct information to the correct user at a context in time. The Information Extraction Module 420 retrieves specific information related to a chosen topic from text data, such as documents, databases, websites, and other sources. Information Extraction (which is also referred to herein as Information Retrieval) can be applied to a variety of textual sources, including emails and web pages, as well as reports, presentations, legal documents, and scientific papers. In one approach of this invention, the extraction of correct information by a processing unit 418, that includes the Information Extraction Module 420, depends on the Entity Extraction Module 422, the Relation Extraction Module 426, and the Attribute Extraction Module 424.

Entity Extraction

In some embodiments, the Entity Extraction Module 422 locates and categorizes named entities mentioned in text, into predefined categories, such as names of people, organizations, and places.

Relation Extraction

In one embodiment of the invention, the Relation Extraction Module 426 identifies the semantic relationship between entities that co-occur or act simultaneously and extracts said relationship. Relationship extraction is the process of extracting a text's semantic relationships. Extracted relationships typically involve two or more entities of a particular type (e.g., person, organization, location), which fall into a variety of semantic categories (e.g., married to, employed by, living in).

Attribute Extraction

In one embodiment of the invention, the Attribute Extraction Module 424 finds and pulls out additional information associated with and/or pertaining to characteristics, relationships, and meaning that increase the understanding of the quality and value of said information. For example, "Nancy is a head nurse, who is currently on call." Nancy is an entity. Her job is being a head nurse. The attribute describing her current situation is, she is on call.'"

Entity Linking

In one embodiment of the invention, an Entity Linking Module 432 is utilized to identify all occurrences of an entity's name in a text or other iconic communication elements. A common use of entity linking is to determine whether two noun phrases refer to the same entity. For example, "John likes to eat cereal for breakfast, but he doesn't like oatmeal." In this example, "he" refers to "John". John is the entity.

Disambiguation

In one embodiment of the invention, a Disambiguation Module 434 figures out the right "sense" (e.g., situational meaning) of a word by looking at how it is used in a certain context. For example, take the word, "bass." It can have a different meaning when used in different contexts. First context: "I can hear the bass clearly in the mix." Second context: "I just caught a bass with my fishing pole."

In some embodiments, the Semantic Database 410, the Data Pre-Processing Module 416, the Information Extraction Module 420, the Entity Extraction Module 422, the Attribute Extraction Module 424, the Relation Extraction Module 426, the Entity Linking Module 432, and/or the Disambiguation Module 434 are accessed, operated, and/or implemented using one or more computing devices (e.g., computers, including but not limited to: supercomputers), handheld devices, telephone computer systems, kiosks, and/or a vast array of other devices).

Figure 5:
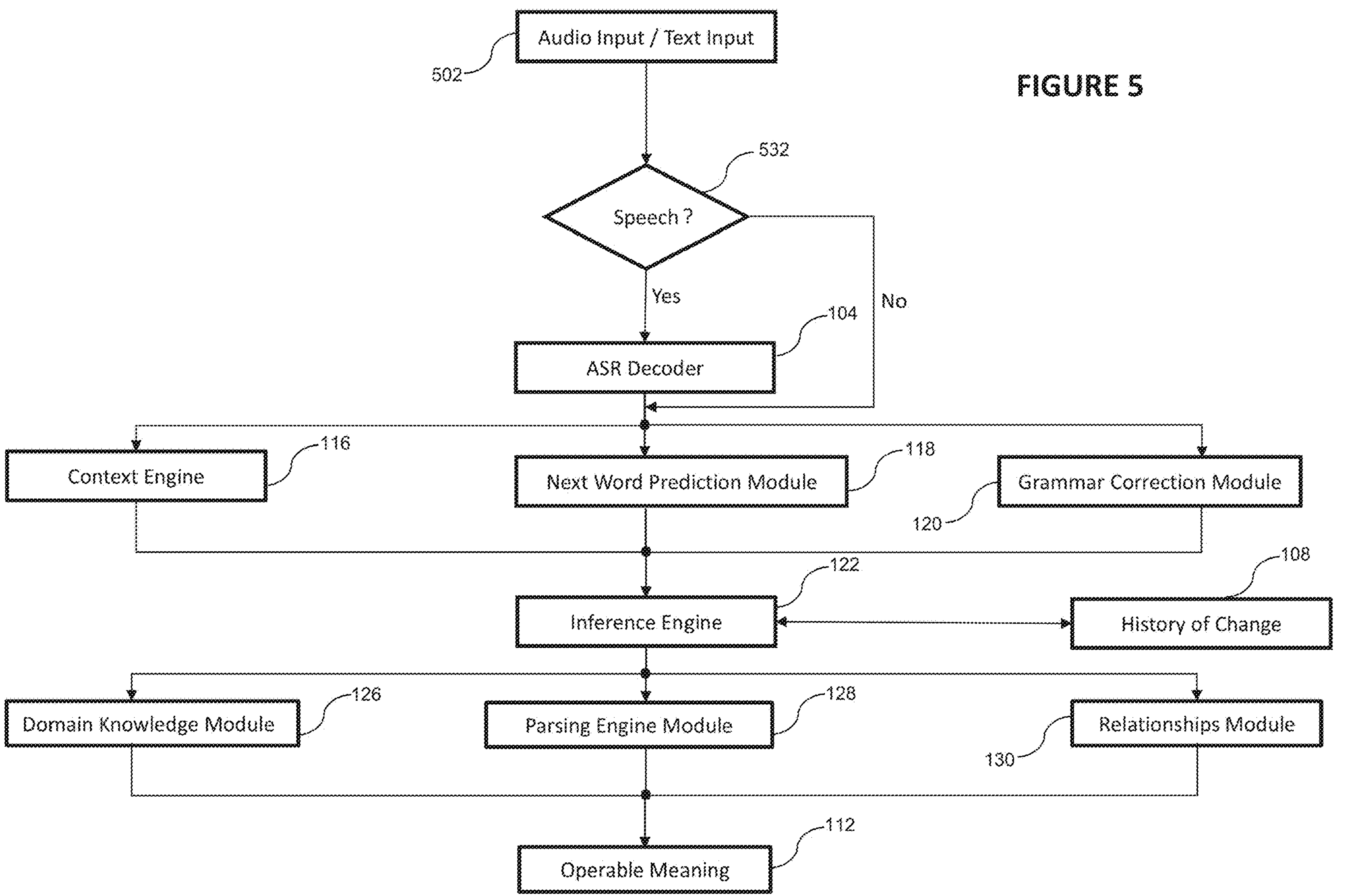
FIG. 5: Is a flowchart describing an embodiment of the process of the system of this invention.

FIG. 5 describes one embodiment of the processing of an input to the system of this invention. A user starts the process by presenting an input 502 to the system. The input 502 may include, for example, audio input, text input, and/or other input. At step 532, it is determined whether the input is speech. If said input is speech, it is sent to the ASR Decoder 104. If not, it is directed to the Context Engine 116, the Next Word Prediction Module 118 and the Grammar Correction Module 120.

If said input 502 is speech, it is decoded by the ASR Decoder 104 by any means disclosed herein or as known to the art. The decoded text is presented to the Context Engine 116, the Next Word Prediction Module 118 and the Grammar Correction Module 120.

By any means known to the art or defined herein, the Context Engine 116 presents a meaning of one or more contexts associated with or otherwise related to said speech input 502. The Next Word Prediction Module 118 augments and clarifies the meaning of the words contained in said speech input. The Grammar Correction Module 120 identifies the right word usage in said speech input which has a correct association with the grammar of said speech input.

The Inference Engine 122 checks the meaning defined by the personal History of Change 108, for the user who presented the input to the system. If meaning is found in said personal History of Change which is relevant to the meaning output of the Inference Engine, said personal History of Change meaning is utilized to modify said Inference meaning output.

As an example, if a user wishes to encrypt some text using a cypher, and the cypher's meaning is already existent in the user's personal History of Change 108, the system automatically utilizes this user-defined meaning and encrypts the text according to the cypher's attributes saved in the user's History of Change.

The Inference Engine 122 passes its current meaning output, or an output modified by found relevant meaning in the user's personal History of Change 108, to the Domain Knowledge Module 126, the Relationships Module 130, and the Parsing Engine 128, of the Semantic Database 110, which collectively produce an Operable Meaning 112.

Figure 6:
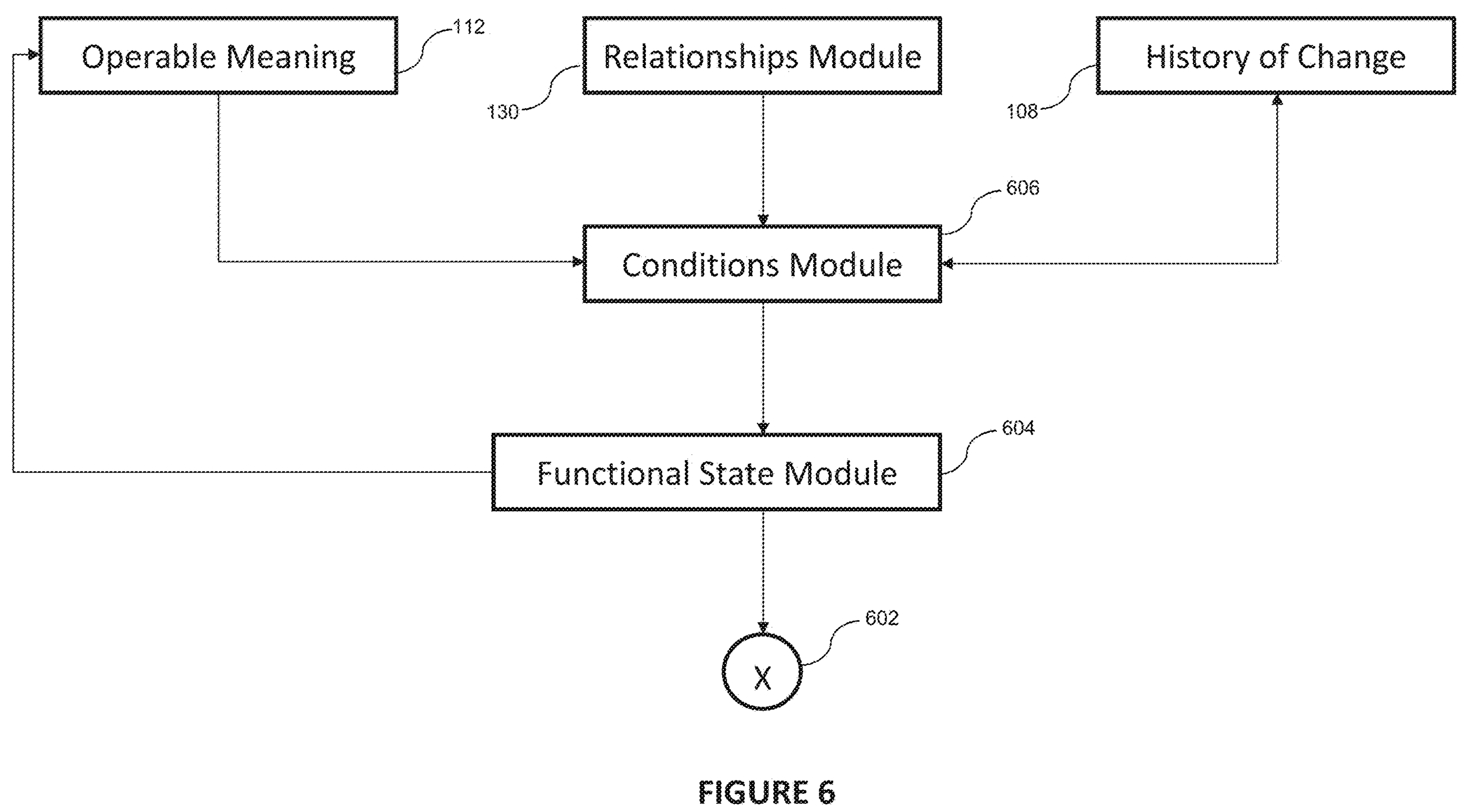
FIG. 6: Depicts an example on how an operable meaning can be utilized.

FIG. 6 depicts an example approach to the utilization of an operable meaning (e.g., the Operable Meaning 112, depicted in FIG. 1A). The output of the Functional State Module 604 is presented to a user 602, or other receiver and/or operator of a state of Operable Meaning 112, which could be software and/or hardware or an equivalent. In this approach, the Functional State Module receives information from the Conditions Module 606 that contains conditions that define an operable meaning. For example, let's say the operable meaning is the ability to apply rotation to another meaning by some means.

Regarding the association of the Relationships Module 130 with the Conditions Module 606, along with the relationship defined operations that are passed through with an Operable Meaning, there are some conditions that indicate which operations are possible and which are not. Said conditions can be user-specific where a user defines their own conditions for these operations via any means available to them, e.g., verbal input, show and tell, text input, and more.

In one approach, the Relationships Module 130 receives data, which can be meaning, from the Semantic Database 110, processes this data, and presents it to the Conditions Module 606. In reference to FIG. 1A and FIG. 6, the Relationships Module 130, builds relationships between entities and attributes of the meaning of the Semantic Database 110. The Conditions Module 606 checks whether the operations defined by the Operable Meaning 112 are possible based on current known conditions or deduced information.

The Functional State Module112 checks to see if it is possible to output a meaning based on the existing meaning of its defined relationships and conditions, as modified (or not) by meaning from the user's History of Change 108.

For example, the Functional State Module 604 checks whether the ability to apply rotation matches the conditions and relationships that have been provided to said Functional State Module. In one embodiment of the invention, the Functional State Module itself is not an output. The Functional State Module verifies or modifies the Operable Meaning 112.

Referring again to FIG. 6, in one approach, the Operable Meaning 112 is the State 1 of said Operable Meaning. The arrow from the Function State Module 604 to the Operable Meaning 112 creates a State 2 of said Operable Meaning. This arrow indicates data sent from said Functional State module to update said Operable Meaning. In one embodiment of this invention, according to this method, the Functional State Module has two tasks: (a) create or modify or verify said Operable meaning as or to another state, and (b) produce an output to the user or other receiver and/or operator of a state of an operable meaning, which could be software and/or hardware or an equivalent. Note: said output can be a query to acquire more information or it can exist as a user-operable function.

It is important to note, the updating of Operable Meaning 112 by Functional State Module 604, can be an ongoing process, whereby new information saved to or otherwise presented by the History of Change 108, causes the Conditions Module 606 to parse said new information such that the output of the Conditions Module alters the condition of the Functional State Module 604, which modifies, or affects in some way or verifies the meaning of the Operable Meaning 112.

If with regards to the Functional State Module 604, the Operable Meaning 112 has all of the information it needs to produce an output, the Functional State Module produces said output and presents said output to the user or other receiver and/or operator of a state of said Operable Meaning. If said Operable Meaning does not have all of the information it needs or if said information is incomplete or conflicts with an additional input from the user or any suitable source, the Functional State Module 604, queries the user to present additional information needed to complete the creation of said Functional State output.

In a key embodiment of this method, a user can teach the system of this invention via one or more inputs to understand a user-defined meaning. As an example only, let's say a user wishes to teach the system how the user wants to draw the image of a snail. The user draws one or more snail images. Then the system responds by drawing one or more snail images of its own and presents them to the user. If the user accepts these drawn images, the system updates its known meaning of this user's drawing definition of a snail image and adds this meaning to the Semantic Database 110, with a reference to the identification (ID) of the specific user who defined this drawing. Plus, the system updates the user's personal History of Change 108, with any new data that is not redundant to pre-existing data in said user's History of Change.

If, however, the system drawn snail has a relationship or condition that is not acceptable to said user, and this user presents one or more additional inputs to modify the outputted snail presented by the system, said Operable Meaning can be modified. As an example, let's say the shell of the snail drawn by the system has a pointed top edge which does not match the shape of a snail shell drawn by the user, and is not acceptable to the user. Let's further say, the user redraws the top edge of the system's drawn snail shell to recontour it, thus removing the pointed top edge. The system updates its meaning of the relationships and conditions that define the user's drawing of a snail to include the user modified state of the system's drawn snail's shell.

The changed condition presented by the user, by redrawing a system drawn shell contour, creates a modified state and this state modifies said operable meaning with conditions that were not part of the previous operable meaning.

It should be noted that said user's input purposed to modify said system's drawn image of said snail, can include speech.

In some embodiments, the conditions module 606 and/or the Functional State module 604 are accessed, operated, and/or implemented using one or more computing devices (e.g., computers, including but not limited to: supercomputers), handheld devices, telephone computer systems, kiosks, and/or a vast array of other devices).

Figure 7:
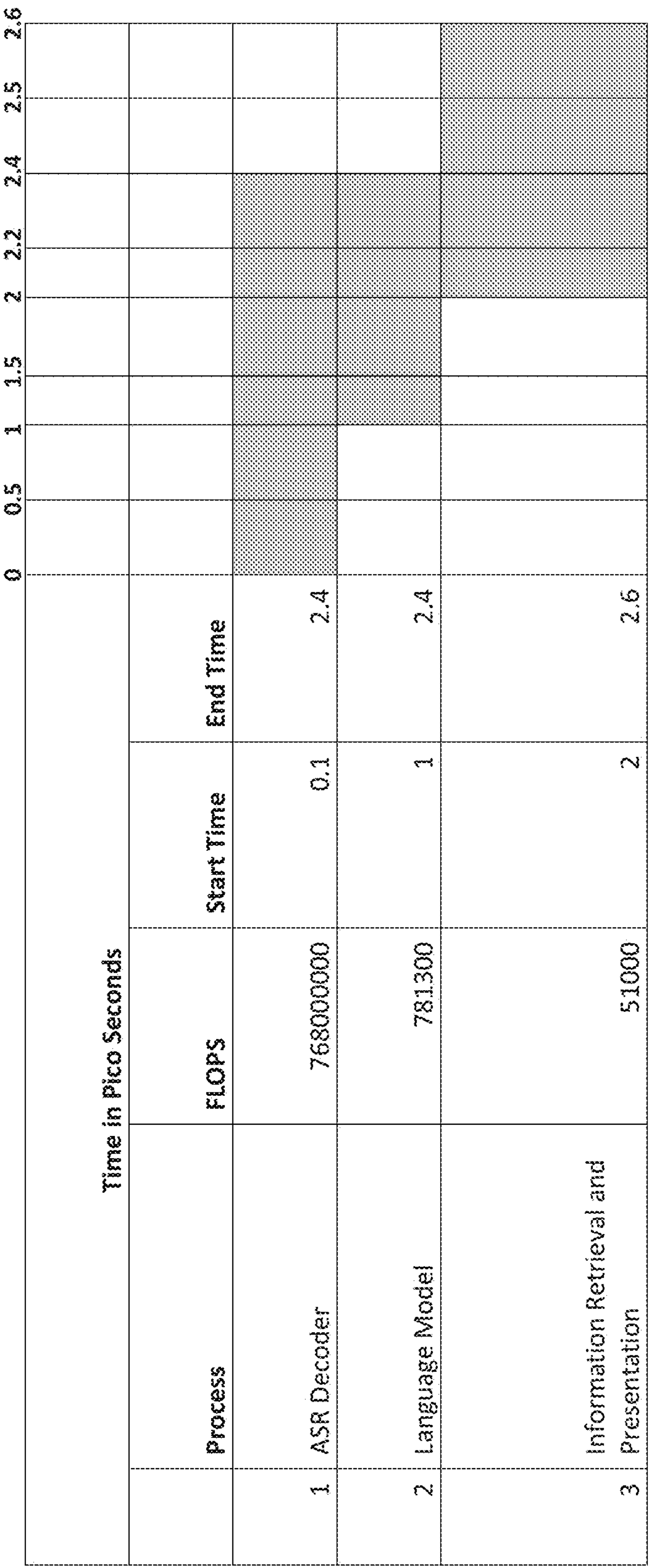
FIG. 7: Depicts example calculations pertaining to the operations of the ASR Decoder, Language Model and the process of information retrieval and presentation.

FIG. 7 is a chart that depicts example mathematical calculations pertaining to the operations of the ASR Decoder 104, the Language Model 106, and the process of information retrieval and presentation. In a key embodiment of the system of the invention, the ASR decoding process begins and runs for 1 picosecond. Then at one picosecond, the Language Model receives the ongoing output from the ASR Decoder. In this example, the ASR decoding process continues for another 1.4 picoseconds. The Language Model processing continues for 1.4 picoseconds. At 2 picoseconds, the process of information and retrieval and presentation begins and concludes with the outputting of an operable meaning at 2.6 picoseconds.

Figure 8:
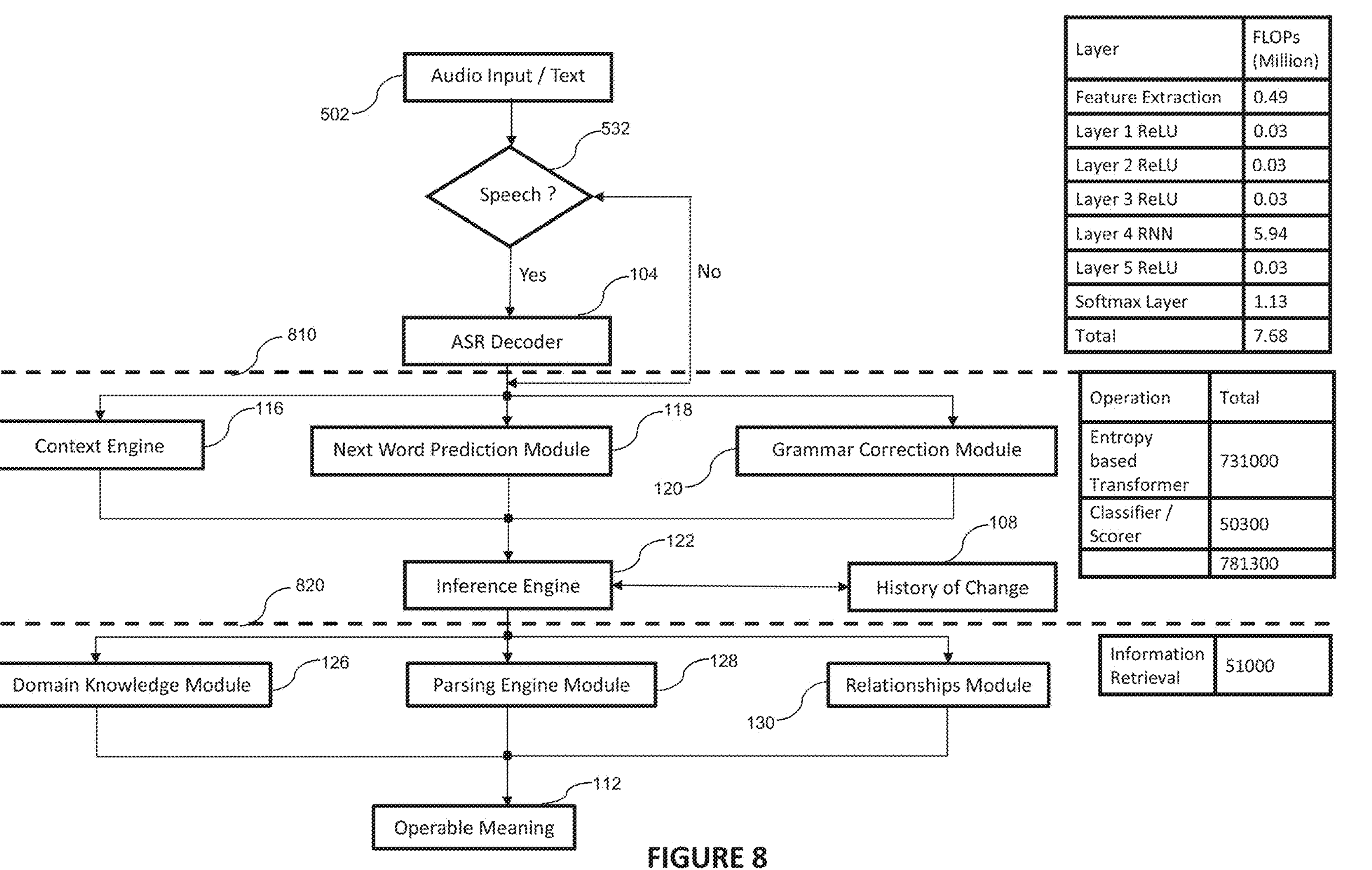
FIG. 8: Depicts the flow chart of FIG. 5 with graphs illustrating the mathematical calculations required for each step.

FIG. 8 depicts the flow chart of FIG. 5 with graphs illustrating the mathematical calculations required for each step. The horizontal dashed lines 810 and 820 divide this flow chart into three areas of processing steps. The processing above the first dashed line 810 is step 1. The processing in between the first and second horizontal dashed lines is step 2. And the processing below the second dashed line 820 is step 3.

Step 1 converts the speech input to text which is processed in Step 2. In a key embodiment of the system of this invention, the ASR Decoder 104 contains a deep learning model which itself contains seven layers. It is important to note, the system of this invention's ASR Decoder is not limit to or defined in scope by any specific number of layers. The discussion of the following seven layers is for illustration purposes only.

This particular deep learning model utilizes 7.68 million floating point operations per second (FLOPS). These layers include: (a) Feature Extraction, (b) Layers 1 to 3, plus 5 ReLU—"rectified linear unit", (c) Layer 4 RNN—"recurrent neural network", and (d) a Softmax Layer, which produces an output in the form of text.

The total processing for these seven layers is, as just cited above, is 7.68 million FLOPS. Of note, Layer 5 consumes more processing power than all of the other layers combined. The RNN layer is responsible for the accurate decoding of the speech to text. The layers within RNN are many-to-many relationships and this makes it computationally intensive. In the example presented in FIG. 8, the RNN layer consumes 5.94 FLOPS.

Decoding speech is a class of problem in time series analysis and RNN can be a complex process utilizing multiple layers which input to strings of layers which act upon themselves. The output of one layer is being fed back to the input of another layer, creating multiple RRN layers within Layer 4, as listed in the chart of FIG. 8.

If the input to the system is text and not speech, Step 1 is the direct input of this text to a Language Model (e.g., the Language Model 106 depicted in FIG. 1), containing the Context Engine 116, the Next Word Prediction Module 118, and the Grammar Correction Module 120, and the Inference Engine 122.

Therefore, with a speech input, the Step 1 round-trip processing load on the system of the invention is 6.78 million FLOPs. But with a text input, the processing load for Step 1 is nil.

Step 2 is the processing of the Language model. This processing utilizes 781,300 FLOPS, which is nearly $1/10^{th}$ the processing required for Step 1.

Step 3 is information retrieval and presentation. It is the least processing intensive step, utilizing 51,000 FLOPS. As disclosed herein, in this step the output of the Inference Engine 122 is presented to the Semantic Database 110, where it is processed and output as Operable Meaning 112.

Figure 9:
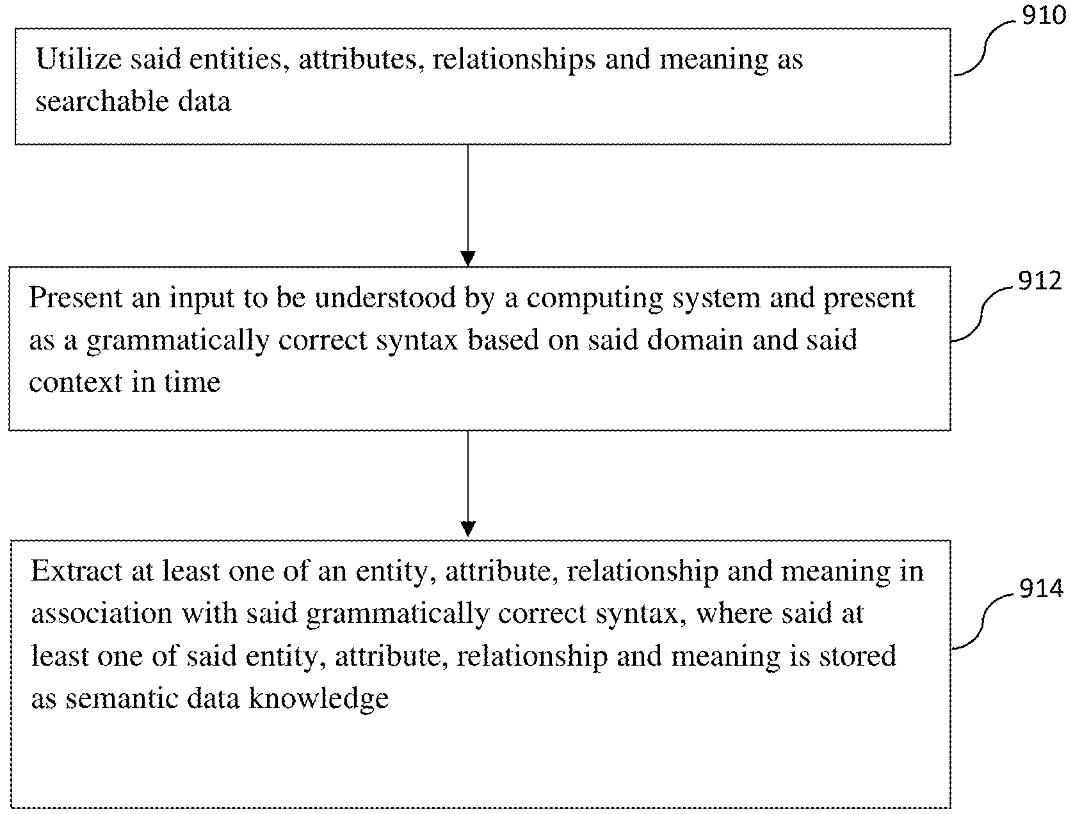
FIG. 9: a flow diagram of a computer-implemented method in accordance with various aspects of the invention.

FIG. 9 is a flow diagram of a computer-implemented method in accordance with various aspects of the invention. A natural language understanding process is operated utilizing at least one of a Machine Learning Model and a Deep Learning Model that generates at least one of the following: entities, attributes, relationships and meaning, connected through at least one of a domain and a context in time, producing an operable meaning. Said natural language understanding process includes, at block 910, utilizing said entities, attributes, relationships and meaning as searchable data, at block 912, presenting an input to be understood by a computing system and presented as a grammatically correct syntax based on said at least one of said domain and said context in time, and at block 914 extracting at least one of an entity, attribute, relationship and meaning in association with said grammatically correct syntax, where said at least one of said entity, attribute, relationship and meaning is stored as semantic data knowledge.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include, without being limited to, a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

Mathematical Induction for a 2.6 Picosecond Round Trip

1 Computational Power

The performance capabilities of supercomputers (such as the Nvidia A100) are represented using a standard rate that indicates the number of floating-point arithmetic computations per second that a machine can perform. The abbreviation for floating-point operations per second is FLOPS.

1.1 Prefixes for representing Order of Magnitude

| Prefix | Abbreviation | Order of magnitude (as a factor of 10) | Computer performance | Storage capacity |
|---|---|---|---|---|
| giga- | G | $10^{9}$ | gigaFLOPS (GFLOPS) | gigabyte (GB) |
| tera- | T | $10^{12}$ | teraFLOPS (TFLOPS) | terabyte (TB) |
| peta- | P | $10^{15}$ | petaFLOPS (PFLOPS) | petabyte (PB) |
| exa- | E | $10^{18}$ | exaFLOPS (EFLOPS) | exabyte (EB) |
| zetta- | Z | $10^{21}$ | zettaFLOPS (ZFLOPS) | zettabyte (ZB) |
| yotta- | Y | $10^{24}$ | yottaFLOPS (YFLOPS) | yottabyte (YB) |

2 Operational or Algorithmic Complexity

Algorithmic Complexity is a concept that is frequently discussed to understand the time taken for an algorithm or a model to predict. It is more difficult than one might believe to assess the complexity of a machine learning algorithm, given that it may be implementation-dependent, the properties of the data may lead to the development of alternative algorithms, and the training time is frequently dependent on the input parameters. The learning algorithms are also sophisticated and dependent on other algorithms.

3 Calculations for ML and Deep Learning Methods

The upper limits for dense data are n as the number of training samples, p as the number of features, n trees as the number of trees (for techniques based on different trees), $n_{sv}$ as the number of support vectors, and $n_{li}$ as the number of neurons in layer i of a neural network. Using these factors, the following approximations may be derived.

| Algorithm | Classification/ Regression | Training | Prediction |
|---|---|---|---|
| Decision Tree | C + R | O(n2p) | O(p) |
| Random Forest | C + R | O(n2pntrees) | O(pntrees) |
| Random Forest | R Breiman implementation | O(n2pntrees) | O(pntrees) |
| Random Forest | C Breiman implementation | O(n2 √ pntrees) | O(pntrees) |
| Extremely Random Trees | C + R | O(npntrees) | O(npntrees) |
| Gradient Boosting (ntrees) | C + R | O(npntrees) | O(pntrees) |
| Linear Regression | R | O(p2n + p3) | O(p) |
| SVM (Kernel) | C + R | O(n2p + n3) | O(nsvp) |
| k-Nearest Neighbours (naive) | C + R | — | O(np) |
| Nearest centroid | C | O(np) | O(p) |
| Neural Network | C + R | ? | O(pnl1 + nl1nl2 + . . . ) |
| Naive Bayes | C | O(np) | O(p) |

3.1 Deep Learning Example

An inference in Deep Learning is the forward propagation procedure that, given an input, yields an output. The classification of a 3D Point Cloud, for instance, may establish the class, while regression can obtain the Bounding Box coordinates of obstacles in a picture or translate the spoken phrase into text.

Knowing the inference time in advance can help you create a model with enhanced performance and inference optimization. For instance, a normal convolution can be replaced with a separable convolution to reduce the number of operations. We can also trim, quantize, or freeze a model. These optimization strategies can substantially alter the result and reduce inference time by seconds.

3.2 to Compute the FLOPs in a Model, the Following Principles Apply

FLOPs=2×Number of Kernel×Kernel Shape×Output Shape

FLOPs=2times Input Size×Output Size

The purpose of these calculations is to compute the number of MACs. The FLOPs are obtained beginning with the 2×.

Pooling Layers–FLOPs=Image Height×Image Depth×Image Width

FLOPs=(Height/Stride)×Depth×(Width/Stride) of a picture each stride.

As a refresher, the layer output shape is Output=(Input Shape−Kernel Shape)+1.

3.3 Let's Compute this Considering the Relationship

First Layer–2×5×(3×3)×26×26=60,840FLOPs

Second layer–2×5×(3×3×5)×24×24=259,200FLOPs

First FC Layer–2×(24×24×5)×128=737,280FLOPs

Second FC Layer–2times128times10=2,560FLOPs 3.4 Determining the Inference Time

Consider a CPU with a performance of 1 GFLOPS.

FLOPs/FLOPS=(1,060,400)/(1,000,000,000)=0.0001s or 1 ms.

3.5 Flow of Round Trip and Calculation

The system of this invention has multiple algorithms, architectures and flows. The following information contains an explanation of the computing resources needed to complete one round trip. In a key embodiment of the invention, a "round trip" is defined as the point of understanding of a user input to the system, to the output of an Operable Meaning, based on said user input.

Simplifying the whole end-to-end we have multiple Modules:

1. Active Speech Recognition (ASR)
2. Language Model
3. Information Retrieval
4. NLU
5. Output 3.5.1 ASR and Language Model Details for Calculations The core of the engine is a recurrent neural network (RNN) trained to ingest speech spectrograms and generate English text transcriptions. Note: while English is presented here, the system of this invention is not limited to a specific language.

Let a single utterance x and label y be sampled from an input $$S = \{(x(1), y(1)), (x(2), y(2)), \ldots\}.$$

Each utterance, x(i) is a time-series of length T(i) where every time-slice is a vector of audio features, x(i)t where t=1, . . . ,T(i).

We use MFCC's as our features;

so x(i)t,p denotes the p-th MFCC feature in the audio frame at time t.

The goal of our RNN is to convert an input sequence x into a sequence of character probabilities for the transcription y, with ŷt=P(ct|x), where for English Ct∈{a,b,c, . . . ,z, space, apostrophe, blank}.

As an example, the RNN model is composed of 5 layers of hidden units. For an input x, the hidden units at layer l are denoted h(l) with the convention that h(0) is the input.

The first three layers are not recurrent.

For the first layer, at each time t, the output depends on the MFCC frame xt along with a context of C frames on each side.

The remaining non-recurrent layers operate on independent data for each time step. Thus, for each time t, the first 3 layers are computed by:

$$h(l)t = g(W(l)h(l-1)t + b(l))$$

where g(z)=min{max{0,z},20} is a clipped rectified-linear (ReLu) activation function and W(l), b(l) are the weight matrix and bias parameters for layer ll. The fourth layer is a recurrent layer. This layer includes a set of hidden units with forward recurrence, h(f):

$$h(f)t=g(W(4)h(3)t+W(f)rh(f)-1+b(4))$$

Note that h(f) must be computed sequentially from t=1 to t=T(i) for the i-th utterance.

The fifth (non-recurrent) layer takes the forward units as inputs $$h(5)=g(W(5)h(f)+h(5))\cdot h(5)=g(W(5)h(f)+b(5)).$$

The output layer is standard logits that correspond to the predicted character probabilities for each time slice tt and character kk in the alphabet:

$$h(6)t,k=\hat{y}t,k=(W(6)h(5)t)k+b(6)kht,k(6)=y\hat{}t,$$

Here b(6)kbk(6) denotes the kk-th bias and (W(6)h(5)t) k(W(6)ht(5))k the kk-th element of the matrix product 3.6 ASR Computational Resources

| Layer | FLOPs (Million) |
|---|---|
| Feature Extraction | 0.49 |
| Layer 1 ReLU | 0.03 |
| Layer 2 ReLU | 0.03 |
| Layer 3 ReLU | 0.03 |
| Layer 4 RNN | 5.94 |
| Layer 5 ReLU | 0.03 |
| Softmax Layer | 1.13 |
| Total | 7.68 |

3.7 Language Model Computational Resources

| Operation | Sub-Operation | FLOPS | Total |
|---|---|---|---|
| Entropy based Transformer | Self-Attention | 603000 | 731000 |
| | Feed Forward | 128000 | |
| Classifier/Scorer | Fully Connect | 25100 | 50300 |
| | Self-Attention | 16800 | |
| | Fully Connect | 4200 | |
| | Fully Connect | 4200 | |
| | | Total | 781300 |

3.8 Output/Operational

This is the final Output. In a key embodiment of the system of this invention, this Output is presented as an Operable Meaning.

A total of (2p−1)*m*n FLOPs, where m and n are rows and columns of the matrix. This gives us 51 K FLOPs for an estimated 26 parameters and with a data nodes of 1000 height.

3.9 Conclusion

According to the above calculations, for a round trip, 789.58K FLOPS are needed.

| Modules | FLOPs |
|---|---|
| Language Model | 781300 |
| Information Retrieval | 51000 |
| ASR | 768000000 |
| Total | 789.58K |

A 5 GHz GPU does the operation in 2 seconds. In this scenario, let's assume a user takes 3 seconds to give an input, by the time the user completes the input, ASR and Information retrieval would have been completed, and $\frac{3}{4}^{ths}$ of the Language model part completes leaving inference alone which is O(p) complexity. That gives us 2.6K Flops. Thus, on a 5 petaflop Supercomputer we achieve this in 2.6 Pico seconds.

What is claimed is:

1. A computer-implemented method comprising a plurality of operations:

a natural language model containing an inference engine receives an input;

said input generates at least one user language model;

said natural language model derives a meaning from said input;

at least one of said inference engine and a domain knowledge module accesses a personal history of change for a source of said input;

said meaning of said input, and at least one meaning saved to said personal history of change that is relevant to said meaning of said input, are utilized to define a parsing of at least one specific meaning saved to a semantic database;

a round trip of processing of said at least one specific meaning within said semantic database is carried out by a plurality of processes, wherein said processes comprise active speech recognition, language modelling, information retrieval, and natural language understanding, which outputs an operable meaning;

said operable meaning is received by a functional state module;

said functional state module checks to see if it is possible to generate an output meaning based on an existing meaning of the functional state's defined relationships and conditions affected by said operable meaning from said user language model;

said semantic database processes a meaning of at least one of said domain knowledge module, a parsing engine module and a relationships module, plus the output meaning of said functional state module, to produce a combined meaning, and outputs said combined meaning as an operable meaning, wherein the active speech recognition runs for a first time period, wherein at an end of the first time period, the language modelling receives an ongoing output from the active speech recognition and continues for a same amount of time as the active speech recognition while the active speech recognition continues, and wherein after a second time period which occurs after the first time period but during the language modelling, the information retrieval begins and concludes with an outputting of the operable meaning, and wherein said round trip is less than or equal to 2.6 picoseconds.

2. The computer-implemented method of claim 1, wherein said semantic database processes known meaning.

3. The computer-implemented method of claim 1, wherein said functional state module performs two additional tasks: verifying a state of said operable meaning, and producing the output meaning to an operator of said state of said operable meaning.

4. The computer-implemented method of claim 1, wherein the meaning of said user language model is defined by the meaning of a user's input at a point in time.

5. The computer-implemented method of claim 1, wherein the meaning of said user language model is defined by the meaning of said user's input according to a context of use.

6. The computer-implemented method of claim 1, wherein new information that is used to update said semantic database is tied to said personal history of change of a user who presents said input.

7. The computer-implemented method of claim 1, wherein information extraction is based on both context in time and a plurality of specific characteristics of a user who presents an input to said natural language model.

8. The computer-implemented method of claim 1, wherein an updating of said operable meaning by said functional state module is an ongoing process.

9. The computer-implemented method of claim 1, wherein extracted information is based on both context in time and a plurality of specific characteristics of a user.

10. The computer-implemented method of claim 1, wherein the information extraction matches correct information to a correct user at a context in time.

11. The computer-implemented method of claim 1, wherein the meaning of said user's input is saved to the said user's personal history of change and becomes part of known knowledge of said semantic database.

12. The computer-implemented method of claim 1, wherein said user language model is saved to a user's personal history of change.

13. The computer-implemented method of claim 1, wherein the language modelling comprises a plurality of operations of a context engine, a next word prediction module, and a grammar correction module.

14. The computer-implemented method of claim 1, wherein the information retrieval comprises a plurality of operations of the domain knowledge module, the parsing engine module, and the relationships module.

* * * * *